United States Patent
Norikane et al.

(10) Patent No.: US 8,765,349 B2
(45) Date of Patent: Jul. 1, 2014

(54) METHOD OF MANUFACTURING TONER, APPARATUS FOR MANUFACTURING TONER, AND METHOD OF MANUFACTURING RESIN PARTICLES

(75) Inventors: Yoshihiro Norikane, Kanagawa (JP); Andrew Mwaniki Mulwa, Kanagawa (JP); Kiyotada Katoh, Shizuoka (JP); Yasutada Shitara, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 9 days.

(21) Appl. No.: 13/557,601

(22) Filed: Jul. 25, 2012

(65) Prior Publication Data

US 2013/0034810 A1 Feb. 7, 2013

(30) Foreign Application Priority Data

Aug. 2, 2011 (JP) .................................. 2011-169364

(51) Int. Cl.
*G03G 5/00* (2006.01)

(52) U.S. Cl.
USPC .............. 430/137.1; 430/137.15; 430/137.19; 399/252; 264/9

(58) Field of Classification Search
USPC .............. 430/137.1, 137.15, 137.19; 399/252; 264/9
See application file for complete search history.

(56) References Cited

U.S. PATENT DOCUMENTS

| 8,084,176 | B2 | 12/2011 | Iwamoto et al. |
| 8,105,742 | B2 | 1/2012 | Norikane et al. |
| 2006/0210909 | A1 | 9/2006 | Ohtani |
| 2007/0275315 | A1 | 11/2007 | Nagatomo et al. |
| 2007/0281236 | A1 | 12/2007 | Watanabe et al. |
| 2007/0281237 | A1 | 12/2007 | Iwamoto et al. |
| 2008/0063971 | A1 | 3/2008 | Watanabe et al. |
| 2008/0118855 | A1 | 5/2008 | Nakayama et al. |
| 2008/0261131 | A1 | 10/2008 | Nakayama et al. |
| 2008/0286680 | A1 | 11/2008 | Norikane et al. |
| 2009/0117486 | A1 | 5/2009 | Watanabe et al. |
| 2009/0170018 | A1 | 7/2009 | Kuramoto et al. |
| 2009/0239170 | A1 | 9/2009 | Honda et al. |
| 2009/0325100 | A1 | 12/2009 | Watanabe et al. |
| 2010/0003613 | A1 | 1/2010 | Honda et al. |

(Continued)

FOREIGN PATENT DOCUMENTS

| JP | 57-201248 | 12/1982 |
| JP | 2003-262976 | 9/2003 |

(Continued)

OTHER PUBLICATIONS

U.S. Appl. No. 13/445,236, filed Apr. 12, 2012, Norikane, et al.

(Continued)

*Primary Examiner* — Mark A Chapman
(74) *Attorney, Agent, or Firm* — Oblon, Spivak, McClelland, Maier & Neustadt, L.L.P.

(57) ABSTRACT

A method of manufacturing toner is provided. In the method, toner constituents are dissolved or dispersed in an organic solvent to prepare a toner constituents liquid. The toner constituents liquid is degassed so that the toner constituents liquid includes dissolved oxygen in an amount of 3 mg/L or less. The toner constituents liquid is vibrated in a chamber having at least one nozzle to form a liquid column resonance standing wave in the toner constituents liquid. The toner constituents liquid is discharged from the nozzle disposed within an area including an antinode of the liquid column resonance standing wave to form the toner constituents liquid into liquid droplets. The liquid droplets are dried to solidify the liquid droplets into solid particles.

8 Claims, 12 Drawing Sheets

(56) References Cited

U.S. PATENT DOCUMENTS

| | | |
|---|---|---|
| 2010/0021209 A1 | 1/2010 | Watanabe et al. |
| 2010/0227267 A1 | 9/2010 | Shitara et al. |
| 2011/0007116 A1 | 1/2011 | Ohgaki |
| 2011/0014565 A1 | 1/2011 | Norikane et al. |
| 2011/0305987 A1 | 12/2011 | Yohichiroh et al. |
| 2012/0070777 A1 | 3/2012 | Makabe et al. |
| 2012/0094231 A1 | 4/2012 | Norikane et al. |

FOREIGN PATENT DOCUMENTS

| | | |
|---|---|---|
| JP | 2003-262977 | 9/2003 |
| JP | 2006-293320 | 10/2006 |
| JP | 2008-286947 | 11/2008 |
| JP | 2011-022181 | 2/2011 |

OTHER PUBLICATIONS

U.S. Appl. No. 13/438,375, filed Apr. 3, 2012, Katoh, et al.

FUNDAMENTAL
PARTICLE (4.2 μm)

2 PARTICLES
COALESCED (5.3 μm)

3 PARTICLES
COALESCED (6.1 μm)

4 PARTICLES
COALESCED (6.7 μm)

FUNDAMENTAL
PARTICLE

2 PARTICLES
COMBINED

3 PARTICLES
COMBINED

METHOD OF MANUFACTURING TONER, APPARATUS FOR MANUFACTURING TONER, AND METHOD OF MANUFACTURING RESIN PARTICLES

CROSS-REFERENCE TO RELATED APPLICATIONS

This patent application is based on and claims priority pursuant to 35 U.S.C. §119 to Japanese Patent Application No. 2011-169364, filed on Aug. 2, 2011, in the Japanese Patent Office, the entire disclosure of which is hereby incorporated herein by reference.

BACKGROUND

1. Technical Field

The present disclosure relates to a method of manufacturing toner, an apparatus for manufacturing toner, and a method of manufacturing resin particles.

2. Description of Related Art

In an electrophotographic or electrostatic image forming apparatus, an electrostatic latent image is formed on a photoreceptor and the electrostatic latent image is developed into a toner image. The toner image is transferred onto a recording medium such as paper and fixed thereon by application of heat and pressure.

To meet recent demand for high-quality image, toner has been developed to have a smaller particle size so that latent images can be more precisely reproduced.

Polymerization methods producing toner in aqueous media have been proposed. Polymerization methods generally produce a toner having a small size, a narrow size distribution, and substantially spherical shape, while consuming large amounts of time, water, and energy. For example, a polymerization method requires a long time period for completing the polymerization and another time period for separating the resultant toner particles from solvent. The toner particles are repeatedly subjected to washing and drying while consuming water and energy.

Japanese Patent Nos. 3786034 and 3786035 and Japanese Patent Application Publication Nos. 57-201248 and 2006-293320 each propose a method called injection granulation method for manufacturing toner. In injection granulation methods, raw materials of toner are dissolved or dispersed in an organic solvent and the resulting liquid is atomized. The atomized particles are dried into toner particles. Because water is not used, injection granulation methods do not need washing and drying processes, which results in drastic reduction of consumed amounts of time and energy.

In some injection granulation methods, some atomized particles may coalesce before the organic solvent is removed therefrom and the coalesced particle is dried into toner particle. As a result, the resulting toner particles may have a wide size distribution.

In some injection granulation methods, nozzles may be clogged with the toner constituents liquid, resulting in poor discharge efficiency and stability.

SUMMARY

In accordance with some embodiments, a method of manufacturing toner is provided. In the method, toner constituents are dissolved or dispersed in an organic solvent to prepare a toner constituents liquid. The toner constituents liquid is degassed so that the toner constituents liquid includes dissolved oxygen in an amount of 3 mg/L or less. The toner constituents liquid is vibrated in a chamber having at least one nozzle to form a liquid column resonance standing wave in the toner constituents liquid. The toner constituents liquid is discharged from the nozzle disposed within an area including an antinode of the liquid column resonance standing wave to form the toner constituents liquid into liquid droplets. The liquid droplets are dried to solidify the liquid droplets into solid particles.

In accordance with some embodiments, an apparatus for manufacturing toner is provided. The apparatus includes a degasifier adapted to degas a toner constituents liquid so that the toner constituents liquid includes dissolved oxygen in an amount of 3 mg/L or less. The toner constituents liquid includes an organic solvent and toner constituents dissolved or dispersed therein. The apparatus further includes a liquid droplet forming device adapted to form the toner constituents liquid into liquid droplets. The liquid droplet forming device includes a chamber having at least one nozzle and a vibrator adapted to vibrate the toner constituents liquid in the chamber to form a liquid column resonance standing wave in the toner constituents liquid. The toner constituents liquid is discharged from the nozzle being disposed within an area including an antinode of the liquid column resonance standing wave. The apparatus further includes a solidifying device adapted to solidify the liquid droplets into solid particles.

In accordance with some embodiments, a method of manufacturing resin particles is provided. In the method, a resin is dissolved or dispersed in an organic solvent or is melted to prepare a resin liquid. The resin liquid is degassed so that the resin liquid includes dissolved oxygen in an amount of 3 mg/L or less. The resin liquid is vibrated in a chamber having at least one nozzle to form a liquid column resonance standing wave in the resin liquid. The resin liquid is discharged from the nozzle disposed within an area including an antinode of the liquid column resonance standing wave to form the resin liquid into liquid droplets. The liquid droplets are dried to solidify the liquid droplets into solid particles.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
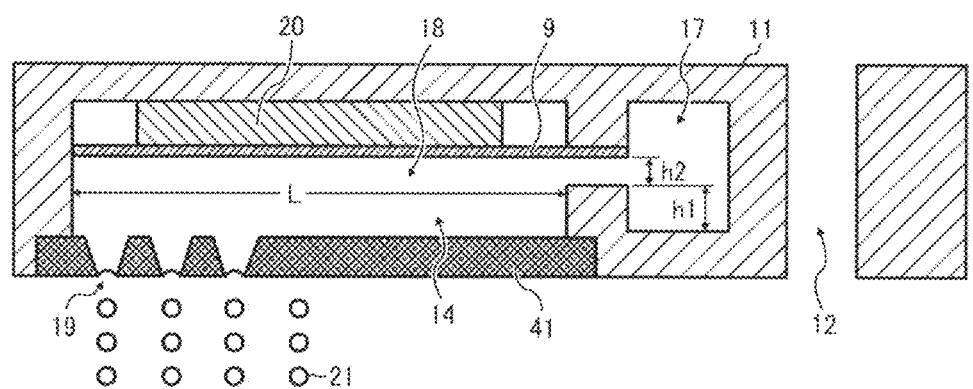
FIG. 1 is a cross-sectional view of a liquid droplet discharge head according to an embodiment.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

According to an embodiment, a method of manufacturing toner is provided. The method includes: dissolving or dispersing toner constituents in an organic solvent to prepare a toner constituents liquid; degassing the toner constituents liquid so that the toner constituents liquid includes dissolved oxygen in an amount of 3 mg/L or less; vibrating the toner constituents liquid in a chamber having at least one nozzle to form a liquid column resonance standing wave in the toner constituents liquid; discharging the toner constituents liquid from the nozzle being disposed within an area including an antinode of the liquid column resonance standing wave, to form the toner constituents liquid into liquid droplets; and drying the liquid droplets to solidify the liquid droplets into solid particles.

According to an embodiment, the toner constituents liquid is contained in the chamber and vibrated by a vibrator so that liquid column resonance occurs therein. When a gaseous substance, in particular, oxygen gas, is being dissolved in the toner constituents liquid, cavitation occurs with a high probability. Cavitation is the formation and then immediate implosion of cavities, i.e., bubbles, in a liquid. When cavitation occurs, the bubbles may prevent reliable vibration of the toner constituents liquid in the chamber. As a result, liquid column resonance does not occur and the toner constituents liquid cannot be formed into liquid droplets.

This problem can be solved when the amount of dissolved oxygen in the toner constituents liquid is 3 mg/L or less.

Some methods of adjusting the amount of dissolved oxygen in the toner constituents liquid to 3 mg/L or less are described below.

In some embodiments, the toner constituents liquid (hereinafter may be "spray liquid") is subjected to degassing so that dissolved gaseous substances are removed, and then hermetically packed with a material having high gas barrier property to remain being degassed.

One method of degassing includes a so-called decompression degassing method. In the decompression degassing method, the spray liquid is contained in a container and the pressure in the container is reduced by a decompressor, such as a suction pump, so that dissolved gaseous substances are removed. While the pressure in the container is reduced, the spray liquid may be agitated. Alternatively, the spray liquid may be applied with ultrasonic vibration so as to accelerate degassing without causing cavitation.

Another method of degassing includes a method in which the spray liquid is allowed to pass a tube formed from a hollow fiber membrane and the outside pressure of the tube is reduced by a decompressor, such as a suction pump, so that dissolved gaseous substances are discharged out of the tube.

Yet another method of degassing includes a method in which dissolved gaseous substances are replaced with a gas having a low solubility in the spray liquid, such as helium gas. For example, the dissolved gaseous substances can be replaced with helium gas by bubbling the spray liquid with helium gas. Gases less soluble in the spray liquid compared to oxygen gas or nitrogen gas can be usable in this method.

A method of measuring the amount of dissolved oxygen is not limited to any particular method. For example, the amount of dissolved oxygen in the spray liquid can be measured by an organic-solvent-responsive dissolved oxygen analyzer DO METER B-506 (from Iijima Electronics Corporation).

The spray liquid which has been subjected to continuous degassing may be used in the liquid droplet discharge process to be described later. The degasifier may include a device for measuring the amount of dissolved oxygen, such as the dissolved oxygen analyzer described above.

The toner constituents liquid including dissolved oxygen in an amount of 3 mg/L or less is formed into liquid droplets by a liquid droplet forming unit. The liquid droplet forming unit has a liquid column resonance liquid chamber. The toner constituents liquid is contained in the liquid column resonance liquid chamber having at least one nozzle and is applied with vibration so that a liquid column resonance standing wave is formed in the toner constituents liquid. The toner constituents liquid is discharged from the nozzle which is disposed within an area including an antinode of the liquid column resonance standing wave.

Figure 2:
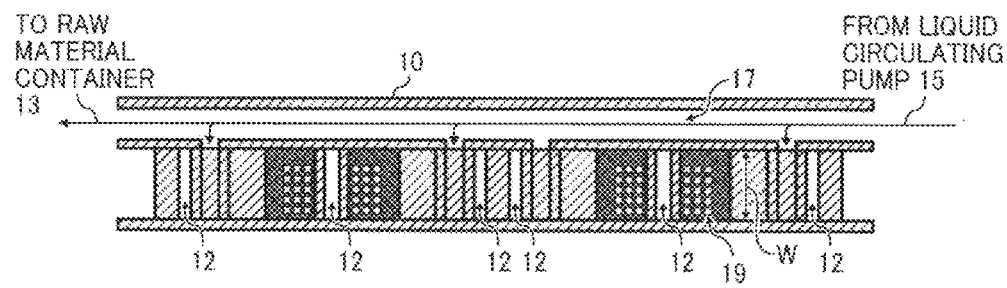
FIG. 2 is a cross-sectional view of a liquid droplet forming unit according to an embodiment.

FIG. 1 is a cross-sectional view of a liquid droplet discharge head according to an embodiment. FIG. 2 is a cross-sectional view of a liquid droplet forming unit according to an embodiment. A liquid droplet discharge head 11 has a liquid common supply path 17 and a liquid column resonance liquid chamber 18. The liquid column resonance liquid chamber 18 is communicated with the liquid common supply path 17 disposed on its one end wall surface in a longer direction. The liquid common supply path 18 has nozzles 19 on one end wall surface in a shorter direction. The nozzles 19 are adapted to discharge toner liquid droplets 21.

The liquid column resonance liquid chamber 18 also has a vibration generator 20 on the wall surface facing the nozzles 19. The vibration generator 20 is adapted to generate high-frequency vibration for generating a standing wave in liquid column resonance. The vibration generator 20 is connected to a high-frequency power source.

The liquid common supply path 17 is communicated with a plurality of liquid column resonance liquid chambers 18. Each of the liquid column resonance liquid chambers 18 is communicated with the liquid common supply path 17 through each liquid supply path.

A toner constituents liquid 14 is flowed into the liquid common supply path 17 disposed in a liquid droplet forming unit 10 by a liquid circulating pump and is supplied to each liquid column resonance liquid chamber 18. Within the liquid column resonance liquid chamber 18, the vibration generator 20 causes liquid column resonance and generates a pressure standing wave. Thus, a pressure distribution is formed therein. The toner liquid droplets 21 are discharged from the nozzles 19.

The nozzles 19 are disposed within an area including an antinode of the pressure standing wave generated in liquid column resonance. Within the area including an antinode of the pressure standing wave, the amplitude of pressure variation is large enough to discharge the toner liquid droplets 21. The area including an antinode is defined as an area including no node of the pressure standing wave. Within the area including an antinode of the pressure standing wave, each of the multiple nozzles 19 discharges uniform liquid droplets at a high efficiency without causing nozzle clogging. In some embodiments, the nozzles 19 are disposed within an area extending from a position at a local maximum amplitude toward a position at a local minimum amplitude for a distance ±⅛ of the wavelength of the pressure standing wave.

After passing the liquid common supply path 17, the toner constituents liquid 14 flows into a liquid return pipe and returns to a raw material container. As the toner liquid droplets 21 are discharged, the amount of the toner constituents liquid 14 in the liquid column resonance liquid chamber 18 is reduced and suction force generated by the action of the standing waves occurred in liquid column resonance is also reduced within the liquid column resonance liquid chamber 18. Thus, the liquid common supply path 17 temporarily increases the flow rate of the toner constituents liquid 14 to fill the liquid column resonance liquid chamber 18 with the toner constituents liquid 14. After the liquid column resonance liquid chamber 18 is refilled with the toner constituents liquid 14, the flow rate of the toner constituents liquid 14 in the liquid common supply path 17 is returned. The toner constituents liquid 14 then starts circulating through a liquid supply pipe and the liquid return pipe again.

In some embodiments, the liquid column resonance liquid chamber 18 is formed of joined frames formed of a material having a high stiffness which does not adversely affect liquid resonant frequency of the toner constituent liquid 14 at drive frequency. Such materials include metals, ceramics, and silicon.

Referring to FIG. 1, a length L between both longitudinal ends of the liquid column resonance liquid chamber 18 may be determined based on a liquid column resonance principle to be described in detail later. Referring to FIG. 2, a width W of the liquid column resonance liquid chamber 18 may be smaller than half of the length L so as not to give excessive frequency to the liquid column resonance.

In some embodiments, the ratio (Le/L) of a distance Le between a longitudinal end of the liquid column resonance liquid chamber 18 on which the liquid common supply path 17 is disposed and the nozzle 19 closest to the longitudinal end to the length L is greater than 0.6.

In some embodiments, the liquid droplet forming unit 10 includes a plurality of liquid column resonance liquid chambers 18 in view of productivity. The number of the liquid column resonance liquid chambers 18 per liquid droplet forming unit 10 is not limited to a particular number. As the number of the liquid column resonance liquid chambers 18 per liquid droplet forming unit 10 increases, productivity increases but operability decreases. In some embodiments, the number of the liquid column resonance liquid chambers 18 per liquid droplet forming unit 10 is 100 to 2,000 in view of productivity and operability. The liquid common supply path 17 is communicated with a plurality of liquid column resonance liquid chambers 18. Each of the liquid column resonance liquid chambers 18 is communicated with the liquid common supply path 17 through each liquid supply path.

The vibration generator 20 may be formed from a piezoelectric body and an elastic plate 9 attached to each other. The elastic plate 9 may constitute a part of the wall of the liquid column resonance liquid chamber 18 so that the piezoelectric body does not contact the toner constituent liquid. The vibration generator 20 in each liquid column resonance liquid chamber 18 may be independently controllable. Alternatively, a single blockish vibrating material may be partially cut to fit the arrangement of the liquid column resonance liquid chambers 18 so that each liquid column resonance liquid chamber 18 is independently controllable through the elastic plate.

The piezoelectric body may comprise a piezoelectric ceramic such as lead zirconate titanate (PZT), a piezoelectric polymer such as polyvinylidene fluoride (PVDF), crystal, or a single crystal of $LiNbO_3$, $LiTaO_3$, or $KNbO_3$.

In some embodiments, each of the nozzles 19 has an outlet diameter of 1 to 40 µm. When the outlet diameter is less than 1 µm, the resulting liquid droplets may be too small to be used as toner particles. Moreover, in a case in which the toner constituents liquid includes solid fine particles such as pigments, the nozzles 19 may be frequently clogged. When the outlet diameter is greater than 40 µm, the resulting liquid droplets may be so large and need to be diluted with an organic solvent. Therefore, a large amount of drying energy is required when obtaining toner particles.

As illustrated in FIG. 2, a plurality of the nozzles 19 may be disposed in the width direction of the liquid column resonance liquid chamber 18, which improves production efficiency.

All the nozzles 19 may have the same outlet diameter. Alternatively, at least one nozzle 19 may have a different outlet diameter from the others.

When the outlet has a true circle shape, the diameter of the true circle is employed as the outlet diameter of the nozzle 19. When the outlet has an ellipsoidal or polygonal (e.g., tetragonal, hexagonal, octagonal) shape, the average diameter is employed as the outlet diameter of the nozzle 19.

At least one nozzle 19 is disposed within one liquid column resonance liquid chamber 18. In some embodiments, the number of the nozzles 19 per liquid column resonance liquid chamber 18 is 2 to 100 in view of productivity. When the number of the nozzles 19 per liquid column resonance liquid chamber 18 is greater than 100, the vibration generator 20 requires a higher voltage, causing unstable behavior of the piezoelectric body.

In some embodiments, the interval between adjacent nozzles 19 is 20 µm or more. When the interval is less than 20 it is likely that liquid droplets discharged from adjacent nozzles collide with each other.

FIGS. 3A to 3D are cross-sectional views of the nozzles 19 in accordance with some embodiments. In an embodiment illustrated in FIG. 3A, a thin film 41 has a half-rounded cross-sectional shape such that the opening diameter of each of the nozzles 19 is gradually reduced from the liquid-contacting surface toward the outlet. In this embodiment, the thin film 41 applies the maximum pressure to the toner constituent liquid at the outlets of the nozzles 19 when vibrating.

Figure 3A:
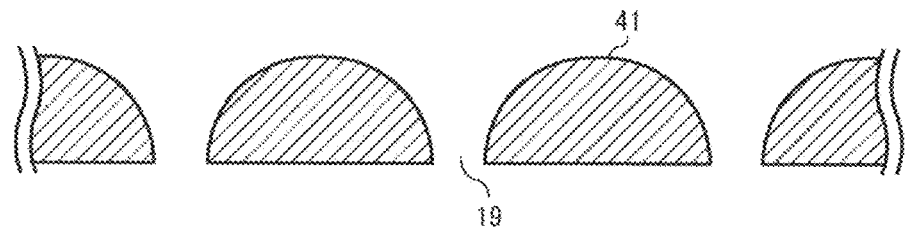
FIGS. 3A to 3D are cross-sectional views of nozzles in accordance with some embodiments.
Figure 3B:
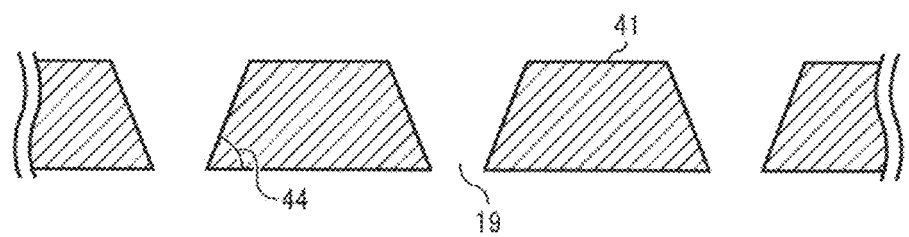
Figure 3C:
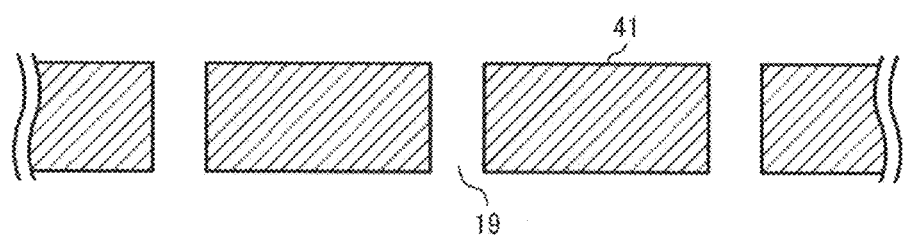
Figure 3D:
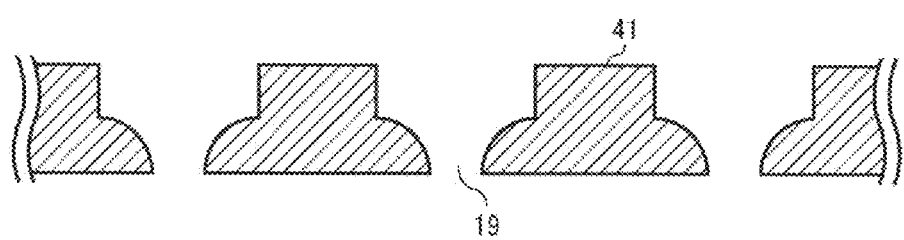

In an embodiment illustrated in FIG. 3B, thin film 41 has a quadrilateral cross-sectional shape with a predetermined nozzle angle 44 such that the opening diameter of each of the nozzles 19 is reduced at a constant rate from the liquid-contacting surface toward the outlet. In this embodiment, the thin film 41 applies the maximum pressure to the toner constituent liquid at the outlets of the nozzles 19 when vibrating. In some embodiments, the nozzle angle 44 is 60 to 90°. When the nozzle angle 44 is less than 60°, it may be difficult to apply pressure to the toner constituent liquid. It may be also difficult to form such nozzles on the thin film 41. When the nozzle angle 44 is 90° as illustrated in FIG. 3C, it may be difficult to apply pressure to the vicinities of the outlets of the nozzles 19. When the nozzle angle 44 is greater than 90°, it may be difficult to apply pressure to the outlets of the nozzles 19, resulting in significantly unstable discharge of liquid droplets. An embodiment illustrated in FIG. 3D is a combination of the embodiments illustrated in FIGS. 3A and 3B. In this embodiment, the cross-sectional shape of the thin film 41 is varied in a stepwise manner.

A mechanism of liquid droplet formation in the liquid droplet forming unit 10 is described in detail below.

First, a mechanism of liquid column resonance generated in the liquid column resonance liquid chamber 18 is described. The resonant wavelength $\lambda$ is represented by the following formula (1):

$$\lambda = c/f \quad (1)$$

wherein c represents a sonic speed in the toner constituents liquid in the liquid column resonance liquid chamber 18 and f represents a drive frequency given to the toner constituents liquid from the vibration generator 20.

Referring to FIG. 1, L represents a length between the fixed end of the frame of the liquid column resonance liquid chamber 18 and the other end thereof closer to the liquid common supply path 17; h1 (e.g., 80 µm) represents a height of the end of the frame of the liquid column resonance liquid chamber 18 closer to the liquid common supply path 17; and h2 (e.g., 40 µm) represents a height of a communication opening between the liquid column resonance liquid chamber 18 and the liquid common supply path 17.

When both ends are fixed (i.e., the end closer to the liquid common supply path 17 is also closed), resonance most effectively occurs when the length L is an even multiple of $\lambda/4$. In this case, the length L is represented by the following formula (2):

$$L = (N/4)\lambda \quad (2)$$

wherein N represents an even number. The formula (2) is also satisfied when both ends of the liquid column resonance liquid chamber 18 are completely open or free.

Similarly, when one end is open or free (so that pressure can be released) and the other end is closed or fixed, resonance most effectively occurs when the length L is an odd multiple of $\lambda/4$. In this case, the length L is represented by the formula (2) as well, wherein N represents an odd number.

Thus, the most effective drive frequency f is derived from the formulae (1) and (2) and represented by the following formula (3):

$$f = N \times c/(4L) \quad (3)$$

wherein f represents a drive frequency given to the toner constituents liquid, L represents a longitudinal length of the liquid column resonance liquid chamber 18, c represents a sonic speed in the toner constituents liquid, and N represents an even integer when both ends are closed or open and an odd integer when one end is closed. In the present embodiment, a vibration having a frequency f derived from the formula (3) is applied to the toner constituent liquid. Actually, vibration is not infinitely amplified because the liquid attenuates resonance due to its viscosity. Therefore, resonance can occur even at a frequency around the most effective drive frequency f represented by the formula (3).

FIGS. 4A to 4D are views of wave configurations (i.e., resonant modes) of velocity and pressure standing waves when N is 1, 2, or 3. FIGS. 5A to 5C are views of wave configurations (i.e., resonant modes) of velocity and pressure standing waves when N is 4 or 5. The standing waves are longitudinal waves in actual but are illustrated as transversal waves in FIGS. 4A to 4D and FIGS. 5A to 5C for the sake of simplicity. In FIGS. 4A to 4D and FIGS. 5A to 5C, solid lines represent velocity standing waves and dotted lines represent pressure standing waves.

In acoustics, an open end is defined as a point at which longitudinal velocity of a medium (e.g., a liquid) is maximum and pressure thereof is zero. A closed end is defined as a point at which longitudinal velocity of the medium is zero. The closed end is acoustically considered as a hard wall that reflects waves.

Figure 4A:
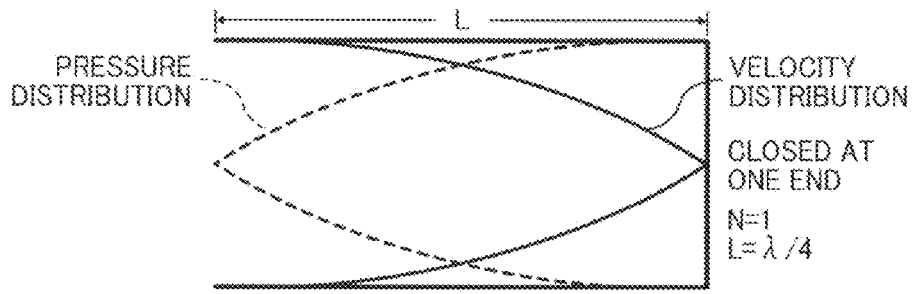
FIGS. 4A to 4D are views of wave configurations (i.e., resonant modes) of velocity and pressure standing waves when N is 1, 2, or 3.
Figure 4B:
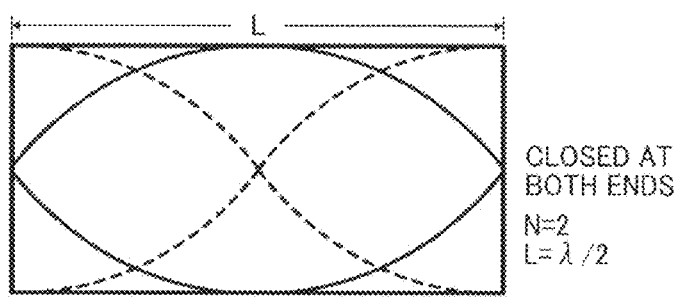
Figure 4C:
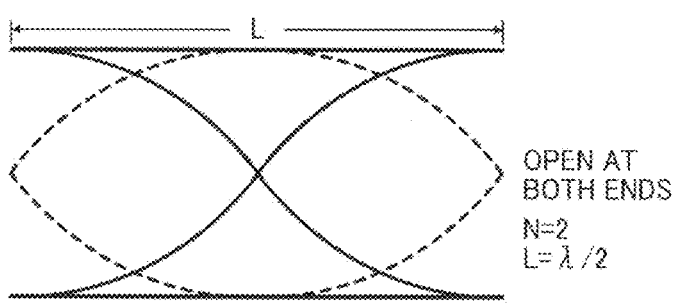
Figure 4D:
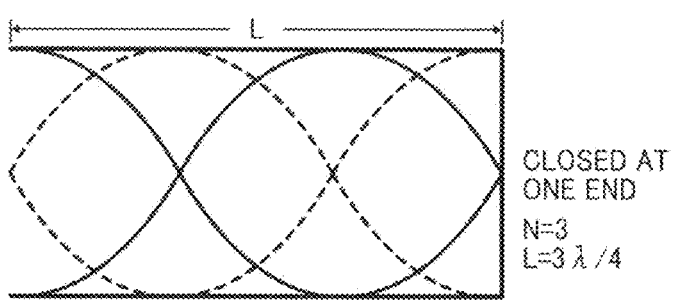
Figure 5A:
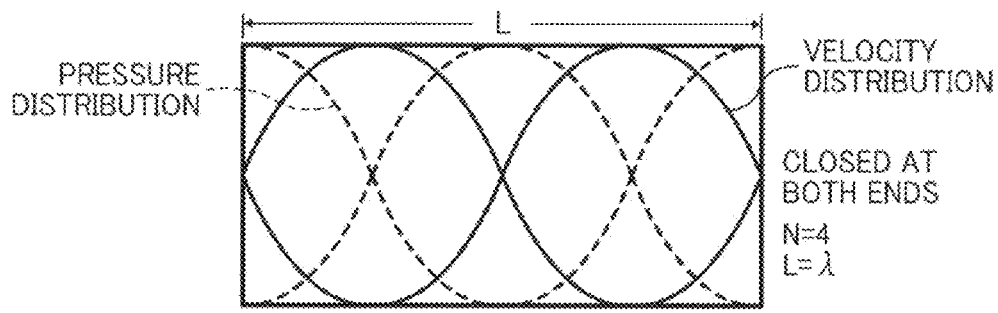
FIGS. 5A to 5C are views of wave configurations (i.e., resonant modes) of velocity and pressure standing waves when N is 4 or 5.
Figure 5B:
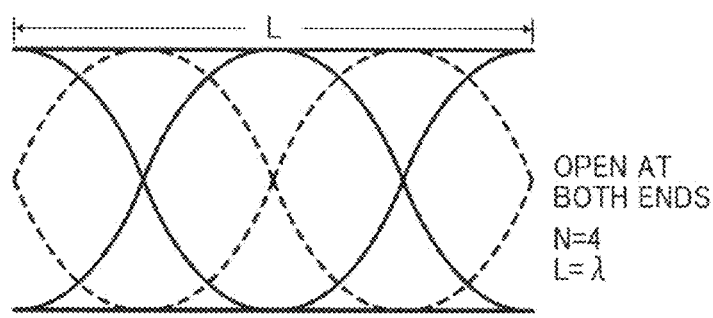
Figure 5C:
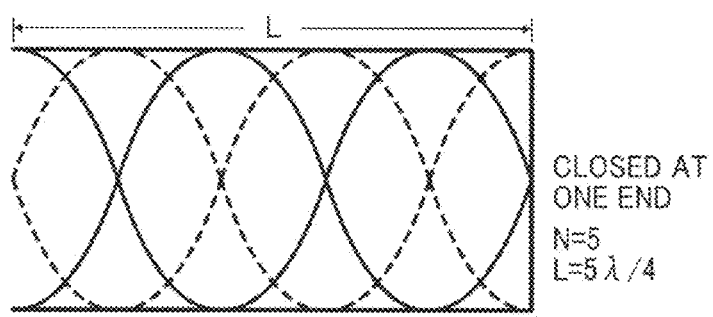

Resonant standing waves as illustrated in FIGS. 4A to 4D and FIGS. 5A to 5C occur when each end is ideally completely closed or open. Referring to FIG. 4A, when one end is closed and N is 1, amplitude of the velocity standing wave is zero at the closed end and is maximum at the open end.

Configurations of standing waves vary depending on the number, arrangement, and/or cross-sectional shape of the nozzles. Thus, resonant frequency can appear even at a position displaced from the position derived from the formula (3). Even in such cases, stable discharge conditions can be provided by adjusting the drive frequency. The condition of either end depends on conditions of nozzles and/or supply openings. Standing waves most effectively occur when N is 1 to 5.

In particular, the drive frequency depends on the number, arrangement, and/or cross-sectional shape of the nozzles 19.

For example, when the sonic speed c in the liquid is 1,200 m/s, the length L between both ends of the liquid column resonance liquid chamber 18 is 1.85 mm, both ends are fixed with wall surfaces, i.e., both ends are closed, and N is 2, the most effective resonant frequency is derived from the formula (3) as 324 kHz.

As another example, when the sonic speed c in the liquid is 1,200 m/s, the length L between both ends of the liquid column resonance liquid chamber 18 is 1.85 mm, both ends are fixed with wall surfaces, i.e., both ends are closed, and N is 4, the most effective resonant frequency is derived from the formula (3) as 648 kHz. Higher resonance can occur in the single liquid column resonance liquid chamber 18.

In some embodiments, both ends of the liquid column resonance liquid chamber 18 are equivalent to closed ends or are regarded as being acoustically soft walls due to the influence of the nozzle openings, both of which increases frequency. Of course, both ends may be equivalent to open ends. The influence of the nozzle openings means a lesser acoustic impedance and a greater compliance component. When the liquid column resonance liquid chamber 18 has wall surfaces on both longitudinal ends, as illustrated in FIG. 4B or FIG. 5A, all possible resonant modes are available as if both ends are closed or one end is open.

In particular, the drive frequency depends on the number, arrangement, and/or cross-sectional shape of the nozzles 19. For example, as the number of the nozzles 19 increases, closed ends of the liquid column resonance liquid chamber 18 are gradually released from restriction. As a result, a resonant standing wave is generated as if both ends are substantially open and the drive frequency is increased. As another example, when each of the nozzles 19 has a round cross-sectional shape or the volume of each nozzle 19 is varied by varying the frame thickness, the actual drive frequency is varied. A liquid column resonant standing wave can generate even at a frequency around the most effective drive frequency for generating a resonant standing wave. When the vibration generator 20 vibrates at a drive frequency f satisfying the following formulae (4) and (5), a liquid column resonance is generated and liquid droplets are discharged from the nozzles 19: wherein L represents a length between both longitudinal ends of the liquid column resonance liquid chamber 18 and Le represents a distance between a longitudinal end of the liquid column resonance liquid chamber 18 closer to the liquid common supply path 17 and the nozzle 19 closest to the longitudinal end.

$$N \times c/(4L) \leq f \leq N \times c/(4Le) \quad (4)$$

$$N \times c/(4L) \leq f \leq (N+1) \times c/(4Le) \quad (5)$$

In some embodiments, Le/L>0.6 is satisfied.

In summary, a standing wave is generated in liquid column resonance caused by a high-frequency driving of the generation vibrator 20 within the liquid column resonance liquid chamber 18. The nozzles 19 are disposed to the position corresponding to antinodes of the standing wave at which the pressure amplitude becomes maximum so that the toner liquid droplets 21 are continuously discharged from the nozzles 19 in accordance with the period of the standing wave.

Details of liquid column resonance generated in the liquid column resonance liquid chamber 18 are described with reference to FIGS. 6A to 6D. In FIGS. 6A to 6D, solid lines represent velocity distributions at arbitrary points within the liquid column resonance liquid chamber 18. With respect to velocity, the direction from the liquid common supply path 17 side toward the liquid column resonance liquid chamber 18 is defined as the plus (+) direction and the opposite direction is defined as the minus (−) direction. Dotted lines represent pressure distributions at arbitrary points within the liquid column resonance liquid chamber 18. A positive (+) pressure and a negative (−) pressure relative to atmospheric pressure respectively create downward and upward pressures in FIGS. 6A to 6D. In FIGS. 6A to 6D, a height (equivalent to h1 in FIG. 1) of the end of the frame of the liquid column resonance liquid chamber 18 closer to the liquid common supply path 17 is twice as much as a height (equivalent to h2 in FIG. 1) of the communication opening between the liquid column resonance liquid chamber 18 and the liquid common supply path 17, which can be assumed that both ends of the liquid column resonance liquid chamber 18 are approximately closed. Thus, FIGS. 6A to 6D represent temporary variations in velocity and pressure distributions under the assumption that both ends of the liquid column resonance liquid chamber 18 are approximately closed.

Figure 6A:
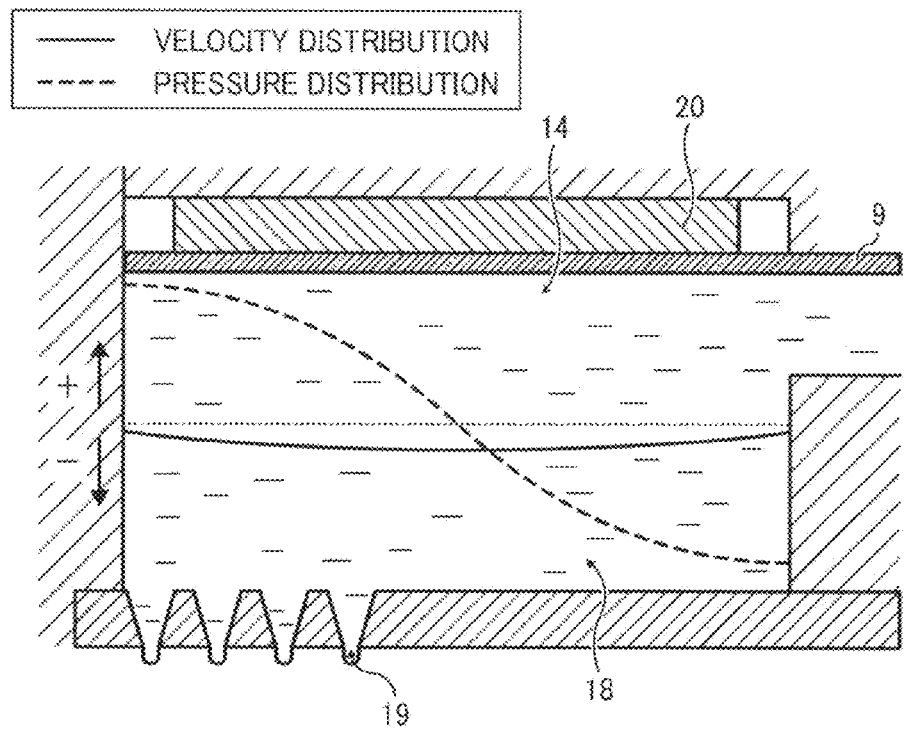
FIGS. 6A to 6D are views of velocity and pressure distributions at arbitrary points within a liquid column resonance liquid chamber according to an embodiment.
Figure 6B:
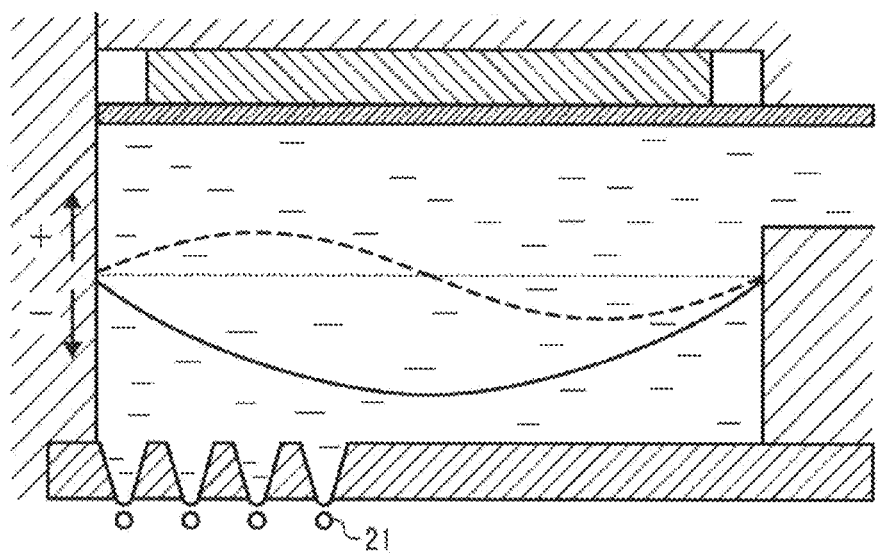

In FIG. 6A, pressure and velocity wave configurations immediately before discharging of liquid droplets from the liquid column resonance liquid chamber 18 are illustrated. Within the liquid column resonance liquid chamber 18, the pressure gradually increases at the position where the nozzles 19 are disposed. Thereafter, as illustrated in FIG. 6B, the positive pressure around the nozzles 19 decreases toward negative pressures so as to start discharging liquid droplets 21.

Figure 6C:
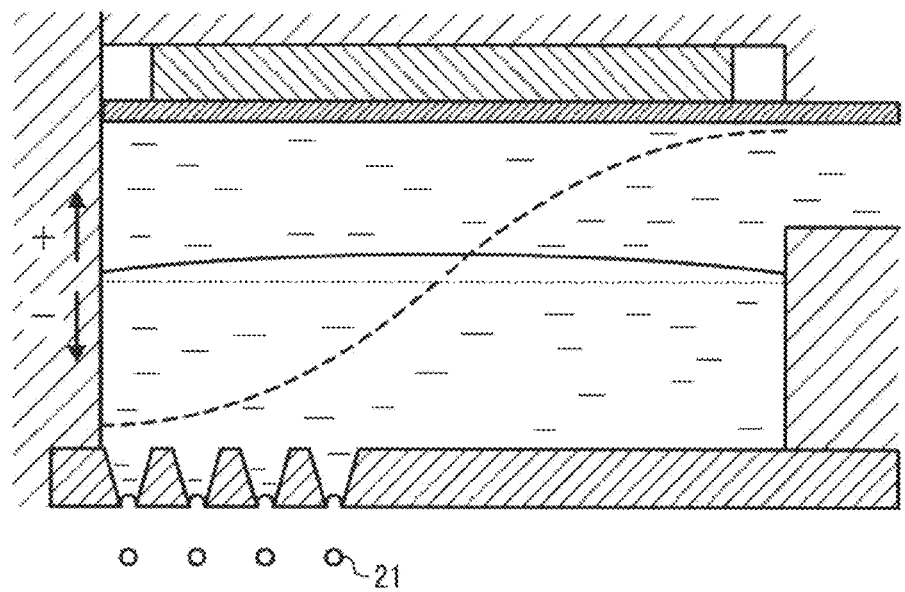
Figure 6D:
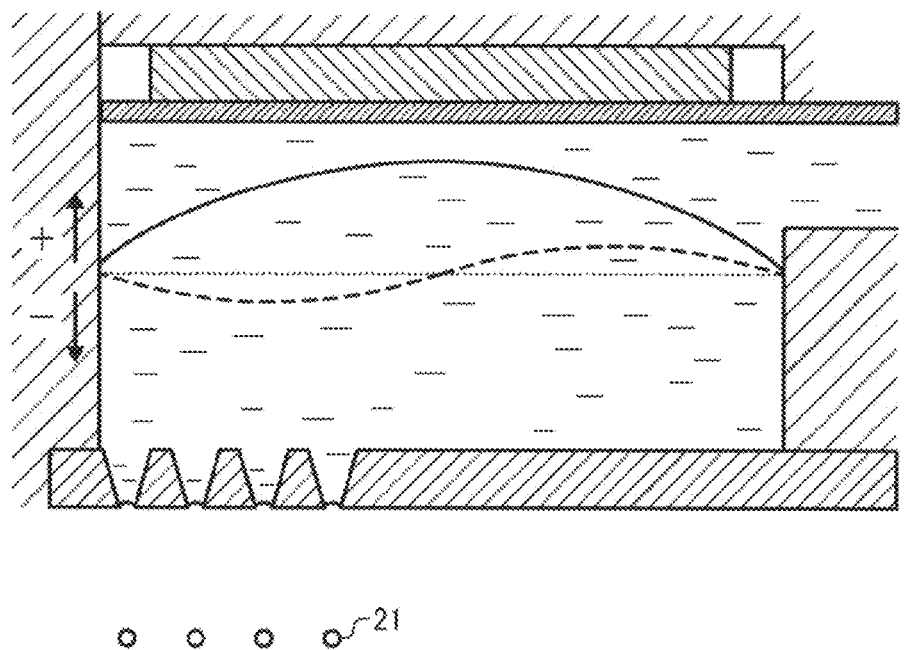

Thereafter, as illustrated in FIG. 6C, the pressure around the nozzles 19 becomes minimum. From this time, filling the liquid column resonance liquid chamber 18 with the toner constituents liquid 14 is started. Thereafter, as illustrated in FIG. 6D, the negative pressure around the nozzles 19 increases toward positive pressures. At this time, filling the liquid column resonance liquid chamber 18 with the toner constituents liquid 14 is terminated. Thereafter, as illustrated in FIG. 6A, the pressure within the liquid column resonance liquid chamber 18 becomes maximum again at the position where the nozzles 19 are disposed so as to start discharging liquid droplets 21 again.

In one embodiment, the length L between both longitudinal ends of the liquid column resonance liquid chamber 18 is 1.85 mm, the resonant mode N is 2, the first to fourth nozzles are disposed to the position corresponding to antinodes of the pressure standing wave, and the drive wave is a sine wave having a drive frequency of 340 kHz.

Figure 7:
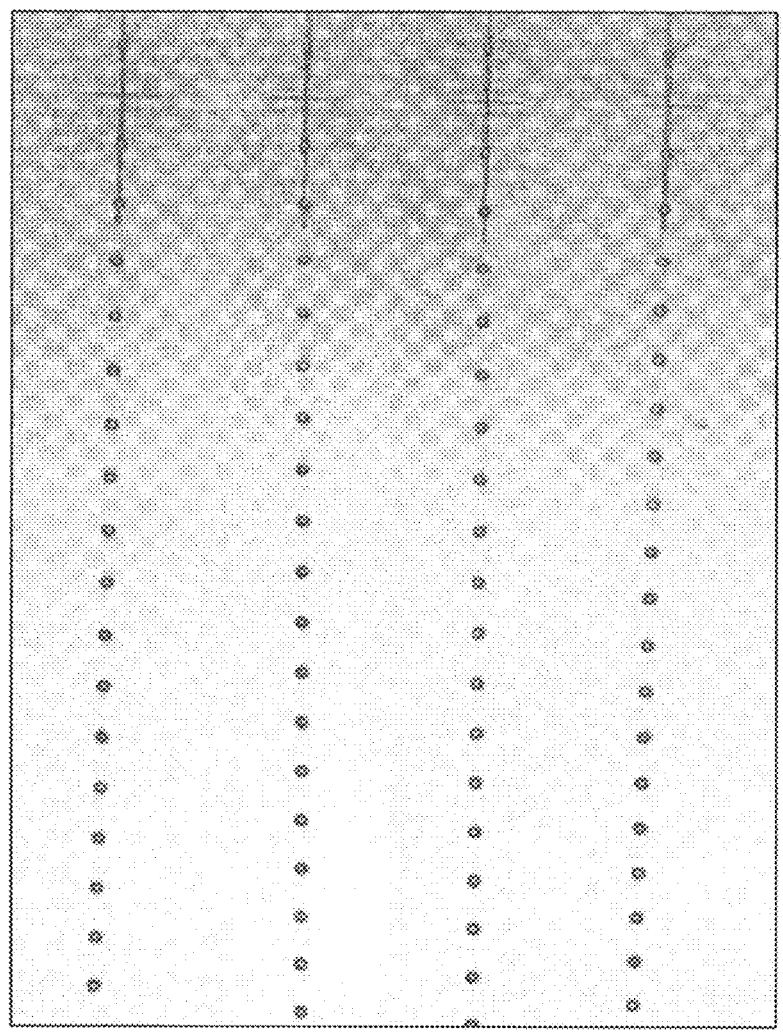
FIG. 7 is a photograph showing liquid droplet discharge phenomenon according to an embodiment obtained by a laser shadowgraphy.
Figure 8:
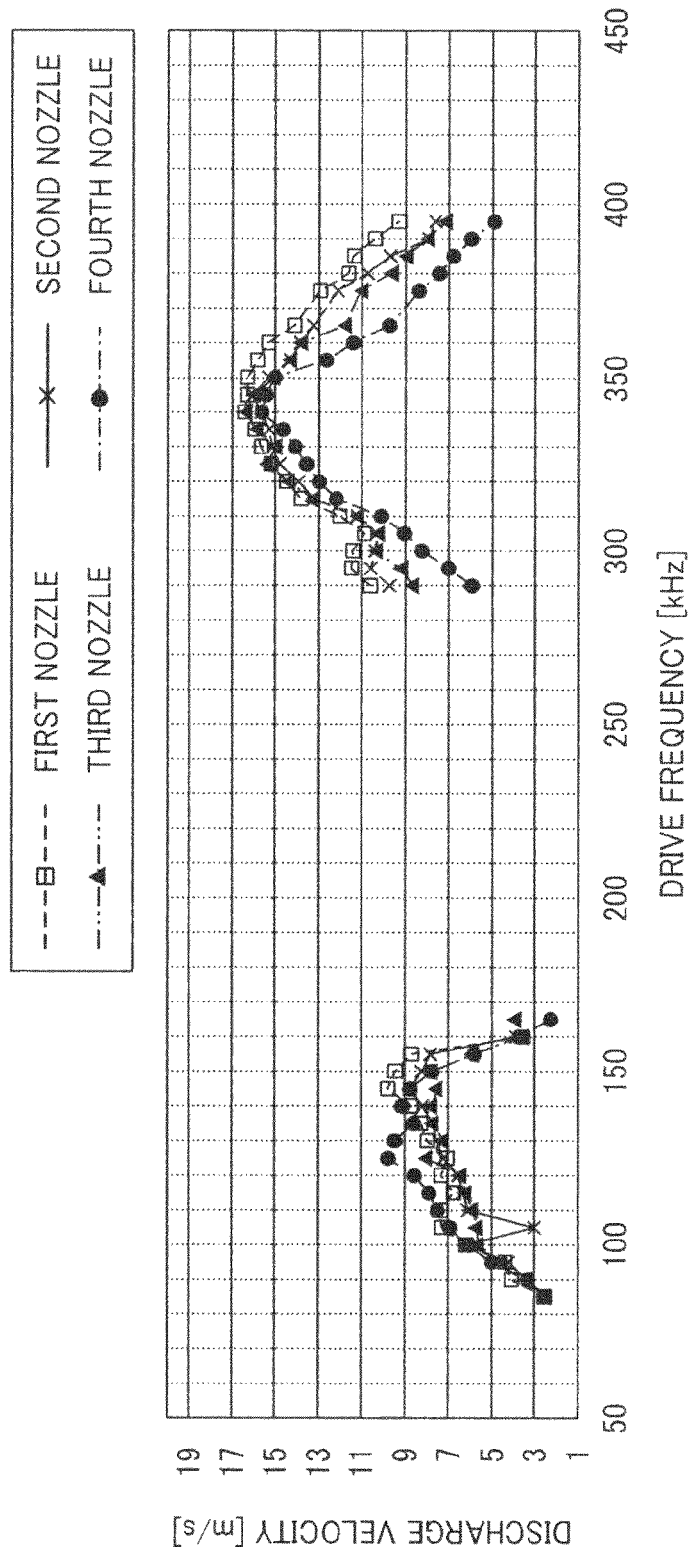
FIG. 8 is a graph showing relations between drive frequency and discharge velocity.

FIG. 7 is a photograph showing liquid droplet discharge phenomenon according to this embodiment obtained by a laser shadowgraphy. It is clear from FIG. 7 that the discharged liquid droplets are very uniform in size and the discharge velocity is constant. FIG. 8 is a graph showing relations between drive frequency and discharge velocity when the drive wave is sine waves having a driving frequency between 290 and 395 kHz with the same amplitude. It is clear from FIG. 8 that the discharge velocities at all the first to fourth nozzles become maximum and uniform when the drive frequency is around 340 kHz. Accordingly, it is clear that the liquid droplet discharge phenomenon occurs at the position corresponding to antinodes of the standing wave having a frequency of 340 kHz, which is the second resonant mode of liquid column resonance. It is also clear from FIG. 8 that the liquid droplet discharge phenomenon does not occur between the first resonant mode around drive frequencies of 130 kHz and the second resonant mode around drive frequencies of 340 kHz.

Figure 9:
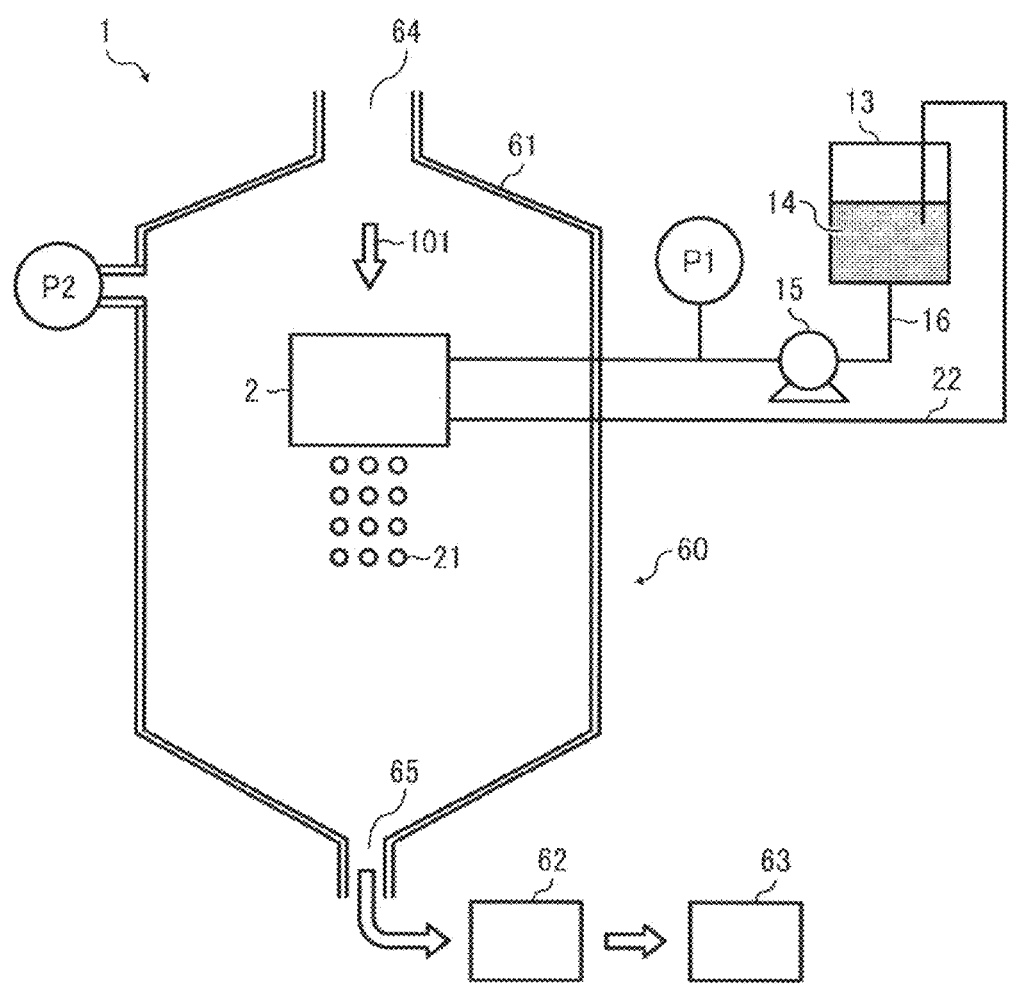
FIG. 9 is a schematic view of a toner manufacturing apparatus according to an embodiment.

FIG. 9 is a schematic view of a toner manufacturing apparatus according to an embodiment. A toner manufacturing apparatus 1 has a liquid droplet discharge unit 2 and a drying collecting unit 60. The liquid droplet discharge unit 2 may comprise the liquid droplet forming unit 10 described above.

The liquid droplet discharge unit 2 is connected to a raw material container 13 and a liquid circulating pump 15. The raw material container 13 contains a toner constituents liquid 14. The liquid circulating pump 15 supplies the toner constituents liquid 14 from the raw material container 13 to the liquid droplet discharge unit 2 through a liquid supply pipe 16. Also, the liquid circulating pump 15 pumps the toner constituents liquid 14 in the liquid supply pipe 16 and returns it to the raw material container 13 through a liquid return pipe 22. It is possible to continually supply the toner constituents liquid 14 to the liquid droplet discharge unit 2.

The liquid supply pipe 16 and the drying collecting unit 60 are equipped with pressure gauges P1 and P2, respectively. The pressure gauges P1 and P2 monitor the liquid feed pressure toward the liquid droplet discharge unit 2 and the inner pressure of the drying collecting unit 60, respectively. In some embodiments, P1 nearly equals P2. When P1>P2, the toner constituents liquid 14 may leak from nozzles. When P1<P2, liquid droplet discharge phenomenon may be stopped due to immersion of gas to the liquid droplet discharge unit 2.

The drying collecting unit 60 has a chamber 61, a toner collecting part 62, and a toner storing part 63. Liquid droplets 21 of the toner constituents liquid 14 are in a liquid state immediately after being discharged from the liquid droplet discharge unit 2. The liquid droplets 21 gradually transit from a liquid state to a solid state as volatile solvents are volatilized while being conveyed within the chamber 61. Droplets in a solid state do not coalesce with each other even when brought into contact with each other. The toner collecting part 62 collects toner particles in a solid state. The toner particles are stored in the toner storing part 63. The toner particles stored in the toner storing part 63 are further subjected to drying, if needed.

Within the chamber 61, a descending conveyance air current 101 is formed through a conveyance air current inlet 64. The liquid droplets 21 discharged from the liquid droplet discharge unit 2 are conveyed downward in a vertical direction by the actions of gravity as well as the conveyance air current 101. Thus, the liquid droplets 21 are prevented from decelerating by air resistance. Even when liquid droplets 21 are continuously discharged, preceding liquid droplets are prevented from decelerating by air resistance and coalescing with subsequent liquid droplets. In the present embodiment, the liquid droplet discharge unit 2 discharges the liquid droplets 21 downward in a vertical direction, but the discharge direction is not limited to a vertical direction is arbitrary. The conveyance air current 101 may be generated by applying pressure to the chamber 61 from the conveyance air current inlet 64 by an air blower or sucking the chamber 61 from a conveyance air current outlet 65. The toner collecting part 62 may comprise a cyclone collector or a back filter, for example.

The conveyance air current 101 may be, for example, laminar flow, swirl flow, or turbulent flow. The conveyance air current 101 may be formed of, for example, air or a noncombustible gas such as nitrogen. The conveyance air current 101 is adapted to accelerate drying of the liquid droplets 21 so that the liquid droplets 21, in a liquid state, are prevented from coalescing with each other. Thus, the conveyance air current 101 does not include vapors of the solvents included in the toner constituents liquid 14. The temperature of the conveyance air current 101 may be arbitrary and constant. The chamber 61 may further include a unit for changing the condition of the conveyance air current 101. The conveyance air current 101 is also adapted to prevent the liquid droplets 21 from adhering to the chamber 61.

As described above, coalescence of the liquid droplets 21 is prevented by the action of the conveyance air current 101. Coalescence of the liquid droplets 21 can be also prevented by generating an auxiliary conveyance air current at the vicinity of the liquid droplet discharge unit 2, charging the liquid droplets 21 to the same polarity, or controlling electric field.

Figure 10:
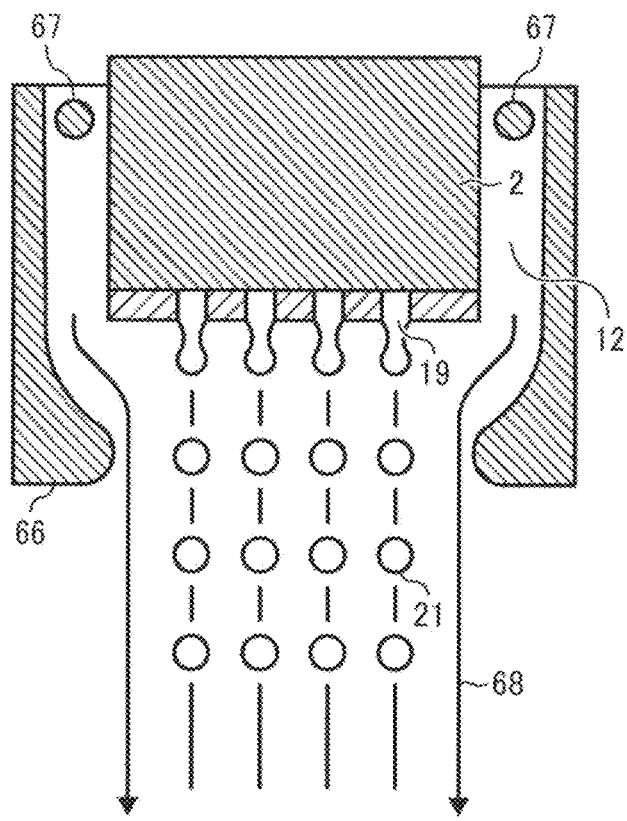
FIG. 10 is a schematic view of a coalescence preventing unit using an auxiliary conveyance air current according to an embodiment.

FIG. 10 is a schematic view of a coalescence preventing unit using an auxiliary conveyance air current according to an embodiment. A shroud 66 is disposed around the liquid droplet discharge unit 2 and an auxiliary conveyance air current inlet 67 is disposed at a part of the shroud 66. A gas is introduced from the auxiliary conveyance air current inlet 67 into an airflow pathway 12 defined by the shroud 66. Thus, an auxiliary conveyance air current 68 is formed at the vicinity of the nozzles 19. The liquid droplets 21 discharged from the liquid droplet discharge unit 2 moves without decelerating by the action of the auxiliary conveyance air current 68. Therefore, the liquid droplets 21 can be prevented from coalescing with each other. The velocity of the auxiliary conveyance air current 68 may be the same as or greater than that of the liquid droplets 21 immediately after being discharged from the liquid droplet discharge unit 2.

In the embodiment illustrated in FIG. 10, the auxiliary conveyance air current 68 and the liquid droplets 21 proceed in the same direction. In some embodiments, the auxiliary conveyance air current 68 and the liquid droplets 21 each proceed in a different direction.

The shroud 66 may have a shape such that its opening diameter is reduced at the vicinity of the nozzles 19 of the liquid droplet discharge unit 2 to control velocity of the air current, as illustrated in FIG. 10, but the opening diameter is not necessarily reduced. The auxiliary conveyance air current 68 may be formed of, for example, air or a noncombustible gas such as nitrogen.

Figure 11:
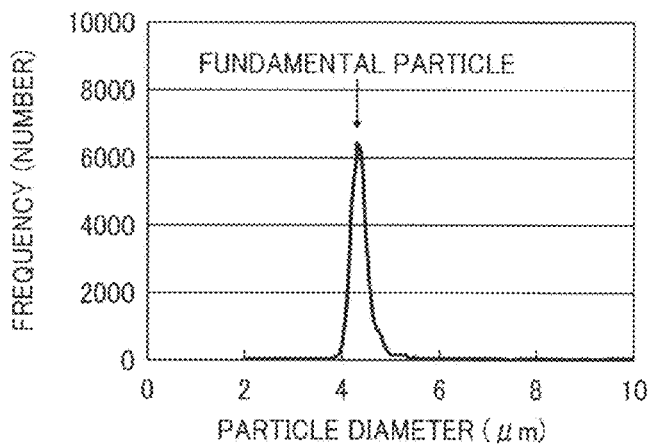
FIG. 11 is a graph showing a particle size distribution of toner particles produced by a method according to an embodiment.

FIG. 11 is a graph showing a particle size distribution of toner particles produced by a method according to an embodiment. The particle size distribution is measured by a flow particle image analyzer FPIA-3000 (from Sysmex Corporation). It is clear from FIG. 11 that the toner particles have a narrow particle size distribution. This indicates that the liquid droplets 21 are not coalesced with each other before being dried.

Figure 12:
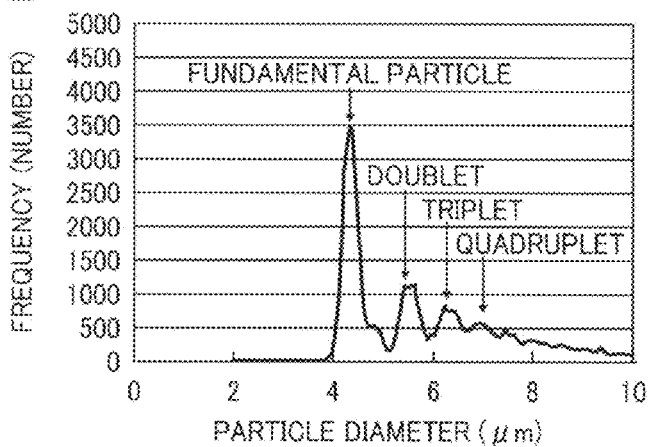
FIG. 12 is a graph showing a particle size distribution of toner particles produced in the same manner as those in accordance with FIG. 11 except that conveyance air current and auxiliary conveyance air current are not formed.
Figure 13:
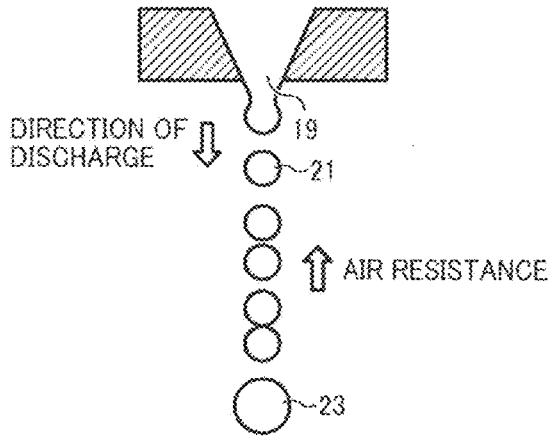
FIG. 13 is a schematic view for explaining production process of toner particles in accordance with FIG. 12.
Figure 14A:
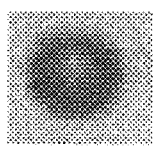
FIGS. 14A to 14D are photographs of the fundamental particle and coalesced particles.
Figure 14B:
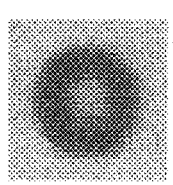
Figure 14C:
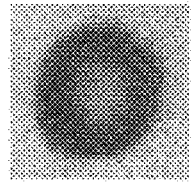
Figure 14D:
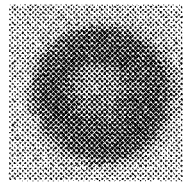

FIG. 12 is a graph showing a particle size distribution of toner particles produced in the same manner as those in accordance with FIG. 11 except that the conveyance air current 101 and auxiliary conveyance air current 68 are not formed. FIG. 13 is a schematic view for explaining production process of toner particles in accordance with FIG. 12. The liquid droplets 21 discharged from the nozzles 19 fall by the gravity while rapidly decelerating due to air resistance. As the velocity of the liquid droplets 21 decreases, the distance between the liquid droplets 21 is shortened and adjacent liquid droplets coalesce into a coalesced particle 23. The coalesced particle 23 receives a greater air resistance and is not likely to dry rapidly. Therefore, the coalesced particle 23 may further coalesce with another liquid droplet. As a result, the resulting toner particles have a wide size distribution. In FIG. 12, a fundamental particle peak is comprised of solid particles obtained when liquid droplets 21 which have not been coalesced are dried. A doublet peak is comprised of solid particles obtained when doubly-coalesced liquid droplets 21 are dried. Triplet and quadruplet peaks are comprised of solid particles obtained when triply- and quadruply-coalesced liquid droplets 21 are dried.

Figure 15A:
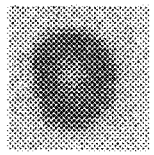
FIGS. 15A to 15C are photographs of the fundamental particle and combined particles.
Figure 15B:
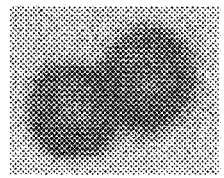
Figure 15C:
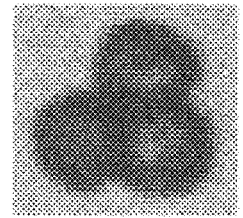

FIGS. 14A to 14D are photographs of the fundamental particle and coalesced particles. FIGS. 15A to 15C are photographs of the fundamental particle and combined particles. In a combined particle, multiple fundamental particles are bound to each other. The combined particle does not divide into fundamental particles even when mechanical impact is made thereon. Thus, the combined particle behaves similarly to a large-diameter particle, which is not preferable. The combined particle is obtained when two droplets which have been dried to some extent bind with each other, followed by drying. More specifically, when multiple droplets which have been dried to some extent accumulate on a wall surface of a piping and bind with each other, followed by drying, solid combined particles are released from the piping and collected. Generation of combined particles can be prevented by rapidly and reliably drying the liquid droplets 21 or controlling air current.

Particle size distribution is determined from the ratio (Dv/Dn) of the volume average particle diameter (Dv) to the number average particle diameter (Dn). The minimum value for Dv/Dn is 1.0. When Dv/Dn is 1.0, it means that all particles have the same size. As Dv/Dn increases, the particle size distribution gets wider. Related-art pulverization toners may have a Dv/Dn of 1.15 to 1.25. Related-art polymerization toners may have a Dv/Dn of 1.10 to 1.15. In some embodiments, toner particles obtained by the method have a Dv/Dn of 1.15 or less or 1.10 or less, which is advantages in terms of printing quality in electrophotography.

In some embodiments, D4/Dn of the toner is 1.00 to 1.15 or 1.00 to 1.10 to reliably produce high-definition images.

When toner particles collected in the drying collecting unit 60 contain a large amount of residual solvent, the toner particles may be optionally subjected to a secondary drying. The secondary drying may be performed by, for example, a fluidized-bed dryer or a vacuum dryer. If toner particles contain residual solvent, toner properties such as heat-resistant storage stability, fixability, and chargeability may deteriorate.

Moreover, when such toner particles are fixed on a recording material by application of heat, the solvent may volatilize and adversely affect users and peripheral devices. Therefore, the amount of residual solvent is made as small as possible.

Methods of preparing the toner constituents liquid and materials usable therefor are described in detail below. For example, the toner constituents liquid may be prepared by dissolving or dispersing toner constituents (e.g., a binder resin, a colorant, a release agent) in an organic solvent.

Alternatively, the toner constituents liquid may be prepared by melting toner constituents (e.g., a binder resin, a colorant, a release agent).

According to an embodiment, a resin liquid prepared by dissolving or dispersing a resin in an organic solvent or melting a resin may be used in place of the toner constituents liquid. In this embodiment, resin particles having a narrow particle size distribution are continuously and reliably produced.

Specific examples of usable binder resins include, but are not limited to, vinyl homopolymers and copolymers of styrene monomers, acrylic monomers, and/or methacrylic monomers, polyester resins, polyol resins, phenol resins, polyurethane resins, polyamide resins, epoxy resins, xylene resins, terpene resins, coumarone indene resins, polycarbonate resins, and petroleum resins.

In some embodiments, the binder resin is a styrene-acrylic resin whose THF-soluble components have a molecular weight distribution such that at least one peak exists within a number average molecular weight range between 3,000 and 50,000 and at least one peak exists at a number average molecular weight range of 100,000 or more when measured by GPC (gel permeation chromatography). Such a binder resin provides a good combination of fixability, offset resistance, and storage stability. In some embodiments, the binder resin includes THF-soluble components having a molecular weight of 100,000 or less in an amount of 50 to 90%. In some embodiments, the binder resin has a molecular weight distribution such that a maximum peak exists within a molecular weight range between 5,000 and 30,000 or between 5,000 and 20,000.

In some embodiments, the binder resin is a vinyl polymer (e.g., a styrene-acrylic resin) having an acid value of 0.1 to 100 mgKOH/g, 0.1 to 70 mgKOH/g, or 0.1 to 50 mgKOH/g.

In some embodiments, the binder resin is a polyester resin whose THF-soluble components have a molecular weight distribution such that at least one peak exists within a number average molecular weight range between 3,000 when measured by GPC (gel permeation chromatography). Such a binder resin provides a good combination of fixability and offset resistance. In some embodiments, the binder resin includes THF-soluble components having a molecular weight of 100,000 or less in an amount of 60 to 100%. In some embodiments, the binder resin has a molecular weight distribution such that at least one peak exists within a molecular weight range between 5,000 and 20,000.

In some embodiments, the binder resin is a polyester resin having an acid value of 0.1 to 100 mgKOH/g, 0.1 to 70 mgKOH/g, or 0.1 to 50 mgKOH/g.

In some embodiments, the binder resin is a resin including a monomer component reactive with a vinyl polymer and/or a polyester resin. Polyester monomers reactive with vinyl polymers include, for example, unsaturated dicarboxylic acids (e.g., phthalic acid, maleic acid, citraconic acid, itaconic acid) and anhydrides thereof. Vinyl monomers reactive with polyester resin include, for example, compounds having carboxyl or hydroxyl group, acrylates, and methacrylates.

In some embodiments, the binder resin is a mixture of two or more of the above polymers, including a polymer having an acid value of 0.1 to 50 mgKOH/g in an amount of 60% by weight or more.

Acid value of the binder resin can be measured based on a method according to JIS K-0070 as follows.

(1) Remove materials other than the binder resin from a sample in advance. Alternatively, measure acid values and contents of the materials in the sample in advance. Thereafter, precisely weigh 0.5 to 2.0 g of the pulverized sample. For example, when the sample is a toner, measure acid values and contents of colorant, magnetic material, etc., included in the toner in advance.

(2) Dissolve the weighed sample in 150 ml of a mixed solvent of toluene/ethanol (4/1 by volume) in a 300-ml beaker.

(3) Subject the resulting liquid to a potentiometric titration using a 0.1 mol/l ethanol solution of KOH.

(4) Determine acid value of the binder resin from the following formula:

$$\text{Acid Value (mgKOH/g)} = [(S-B) \times f \times 5.61]/W$$

wherein W (g) represents the weight of the sample, S (ml) represents the used amount of the ethanol solution of KOH in the titration, B (ml) represents the used amount of the ethanol solution of KOH in a blank titration, and f represents the factor of KOH.

In some embodiments, the binder resin has a glass transition temperature (Tg) of 35 to 80° C. or 40 to 75° C. in view of storage stability of the toner. When Tg is less than 35° C., the toner may easily deteriorate in high-temperature atmosphere. The deteriorated toner may easily cause hot offset. When Tg is greater than 80° C., the toner may have poor fixability.

Specific examples of usable magnetic materials include, but are not limited to, magnetic iron oxides (e.g., magnetite, maghemite, ferrite) and iron oxides containing other metal oxides; metals (e.g., iron, cobalt, nickel) and their alloys with aluminum, cobalt, copper, lead, magnesium, tin, zinc, antimony, beryllium, bismuth, cadmium, calcium, manganese, selenium, titanium, tungsten, and vanadium; and mixtures of the above compounds.

Specific examples of usable magnetic materials further include, but are not limited to, $Fe_3O_4$, $\gamma\text{-}Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, iron powder, cobalt powder, and nickel powder. Two or more of these resins can be used in combination. In some embodiments, fine powders of $Fe_3O_4$ and $\gamma\text{-}Fe_2O_3$ are used.

Additionally, magnetic iron oxides (e.g., magnetite, maghemite, ferrite) including a heterogeneous element and mixtures thereof are also usable. The heterogeneous element may be, for example, lithium, beryllium, boron, magnesium, aluminum, silicon, phosphorus, germanium, zirconium, tin, sulfur, calcium, scandium, titanium, vanadium, chrome, manganese, cobalt, nickel, copper, zinc, or gallium. In some embodiments, magnesium, aluminum, silicon, phosphorus, or zirconium is used. The heterogeneous element may be incorporated into crystal lattice of an iron oxide. Alternatively, an oxide of the heterogeneous element may be incorporated into an iron oxide. Alternatively, an oxide or hydroxide of the heterogeneous element may exist on the surface of an iron oxide. In some embodiments, an oxide of the heterogeneous element is incorporated into an iron oxide.

The heterogeneous element may be incorporated into an iron oxide by mixing a salt of the heterogeneous element with raw materials of the iron oxide while controlling pH. The heterogeneous element may be deposited on the surface of iron oxide particles by controlling pH or adding a salt of the heterogeneous element after the iron oxide particles are produced.

In some embodiments, the content of the magnetic material is 10 to 200 parts by weight or 20 to 150 parts by weight based on 100 parts of the binder resin. In some embodiments, the magnetic material has a number average particle diameter of 0.1 to 2 µm or 0.1 to 0.5 µm. The number average particle diameter may be determined by analyzing a transmission electron microscope image of the magnetic material with a digitizer.

In some embodiments, the magnetic material has an antimagnetic force of 20 to 150 oersted, a saturated magnetization of 50 to 200 emu/g, and a remanent magnetization of 2 to 20 emu/g in a magnetic field of 10K oersted.

The magnetic material may be used as a colorant.

The toner including a colorant is adapted to produce colors on paper or image carriers. The toner including no colorant is adapted to improve image gloss or to protect image. The toner according to an embodiment may be used as either a black toner, a colored toner, or a transparent toner.

Specific examples of usable colorants include, but are not limited to, carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red FSR, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, and lithopone. Two or more of these colorants can be used in combination.

In some embodiments, the content of the colorant in the toner is 1 to 15% by weight or 3 to 10% by weight.

The colorant can be combined with a resin to be used as a master batch. Specific examples of usable resin for the master batch include, but are not limited to, polyester resins, polymers of styrene or styrene derivatives (e.g., polystyrene, poly-p-chlorostyrene, polyvinyl toluene), styrene-based copolymers (e.g., styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleic acid copolymer, styrene-maleate copolymer), polymethyl methacrylate, polybutyl methacrylate, polyvinyl chloride, polyvinyl acetate, polyethylene, polypropylene, epoxy resin, epoxy polyol resin, polyurethane, polyamide, polyvinyl butyral, polyacrylic acid resin, rosin, modified rosin, terpene resin, aliphatic or alicyclic hydrocarbon resin, aromatic petroleum resin, chlorinated paraffin, and paraffin wax. Two or more of these resins can be used in combination.

The master batch can be obtained by mixing and kneading a resin and a colorant while applying a high shearing force. To increase the interaction between the colorant and the resin, an organic solvent can be used. More specifically, the maser batch can be obtained by a method called flushing in which an aqueous paste of the colorant is mixed and kneaded with the resin and the organic solvent so that the colorant is transferred to the resin side, followed by removal of the organic solvent and moisture. This method is advantageous in that the resulting wet cake of the colorant can be used as it is without being dried. When performing the mixing or kneading, a high shearing force dispersing device such as a three roll mill can be preferably used.

In some embodiments, the content of the master batch is 0.1 to 20 parts by weight based on 100 parts by weight of the binder resin.

In some embodiments, the resin for the master batch has an acid value of 30 mgKOH/g or less and an amine value of 1 to 100 mgKOH/g. In some embodiments, the resin for the master batch has an acid value of 20 mgKOH/g or less and an amine value of 10 to 50 mgKOH/g. When the acid value is greater than 30 mgKOH/g, chargeability and colorant dispersibility may be poor under high-humidity conditions. When the amine value is less than 1 mgKOH/g or greater than 100 mgKOH/g, colorant dispersibility may be poor. Acid value can be measured based on a method according to JIS K0070. Amine value can be measured based on a method according to JIS K7237.

In some embodiments, a colorant dispersant can be used in combination with the colorant. Usable colorant dispersants may have high compatibility with the binder resin.

For example, commercially available colorant dispersants such as AJISPER PB821 and PB822 (from Ajinomoto Fine-Techno Co., Inc.), DISPERBYK-2001 (from BYK-Chemie GmbH), and EFKA-4010 (from EFKA) are usable.

In some embodiments, the content of the colorant dispersant is 0.1 to 10% by weight based on the colorant. When the content is less than 0.1% by weight, colorant dispersibility may be poor. When the content is greater than 10% by weight, chargeability of the toner may be poor under high-humidity conditions. In some embodiments, the colorant dispersant has a weight average molecular weight of 500 to 100,000, 3,000 to 100,000, 5,000 to 50,000, or 5,000 to 30,000. The weight average molecular weight is determined from a maximum peak in a styrene-conversion molecular weight distribution obtained by gel permeation chromatography. When the weight average molecular weight is less than 500, it means that the polarity of the dispersant is so high that colorants cannot be finely dispersed. When the molecular weight is greater than 100,000, it means that affinity of the dispersant for solvents is so high that colorants cannot be finely dispersed.

In some embodiments, the content of the colorant dispersant is 1 to 200 parts by weight or 5 to 80 parts by weight based on 100 parts by weight of the colorant. When the content is less than 1 part by weight, colorant dispersibility may be poor. When the content is greater than 200 parts by weight, chargeability of the toner may be poor.

In some embodiments, the toner includes a release agent. The release agent is adapted to prevent the occurrence of toner offset phenomenon when the toner is fixed on a recording medium.

Specific examples of usable release agents include, but are not limited to, aliphatic hydrocarbon waxes (e.g., low-molecular-weight polyethylene, low-molecular-weight polypropylene, polyolefin wax, microcrystalline wax, paraffin wax, SASOL wax), aliphatic hydrocarbon wax oxides (e.g., oxidized polyethylene wax) and block copolymers thereof, plant waxes (e.g., candelilla wax, carnauba wax, sumac wax, jojoba wax), animal waxes (e.g., bees wax, lanolin, spermaceti), mineral waxes (e.g., ozokerite, ceresin, petrolatum), waxes mainly composed of fatty acid esters (e.g., montanate wax, castor wax), and partially or completely deoxidized fatty acid esters (e.g., deoxidized carnauba wax). Specific examples of usable release agents further include, but are not limited to, saturated straight-chain fatty acids (e.g., palmitic acid, stearic acid, montanic acid, straight-chain alkylcarboxylic acids), unsaturated fatty acids (e.g., brassidic acid, eleostearic acid, parinaric acid), saturated alcohols (e.g., stearyl alcohol, eicosyl alcohol, behenyl alcohol, carnaubyl alcohol, ceryl alcohol, melissyl alcohol, long-chain alkyl alcohol), polyols (e.g., sorbitol), fatty acid amides (e.g., linoleic acid amide, olefin acid amide, lauric acid amide), saturated fatty acid bisamides (e.g., methylenebis capric acid amide, ethylenebis lauric acid amide, hexamethylenebis stearic acid amide), unsaturated fatty acid amides (e.g., ethylenebis oleic acid amide, hexamethylenebis oleic acid amide, N,N'-dioleyl adipic acid amide, N,N'-dioleyl sebacic acid amide), aromatic biamides (e.g., m-xylenebis stearic acid amide, N,N-distearyl isophthalic acid amide), metal salts of fatty acids (e.g., calcium stearate, calcium laurate, zinc stearate, magnesium stearate), aliphatic hydrocarbon waxes to which a vinyl monomer such as styrene and an acrylic acid is grafted, partial ester compounds of a fatty acid with a polyol (e.g., behenic acid monoglyceride), and methyl ester compounds having a hydroxyl group obtained by hydrogenating plant fats.

Specific examples of usable release agents further include, but are not limited to, a polyolefin obtained by radical polymerizing an olefin under high pressure; a polyolefin obtained by purifying low-molecular-weight byproducts of a high-molecular-weight polyolefin; a polyolefin polymerized under low pressures in the presence of a Ziegler catalyst or a metallocene catalyst; a polyolefin polymerized using radiation, electromagnetic wave, or light; a low-molecular-weight polyolefin obtained by thermally decomposing a high-molecular-weight polyolefin; paraffin wax; microcrystalline wax; Fischer-Tropsch wax; synthetic hydrocarbon waxes synthesized by Synthol method, Hydrocaol method, or Arge method; synthetic waxes including a compound having one carbon atom as a monomer unit; hydrocarbon waxes having a functional group such as hydroxyl group and carboxyl group; mixtures of a hydrocarbon wax and a hydrocarbon wax having a functional group; and these waxes to which a vinyl monomer such as styrene, a maleate, an acrylate, a methacrylate, or a maleic anhydride is grafted.

The above release agents being further subjected to a press sweating method, a solvent method, a recrystallization method, a vacuum distillation method, a supercritical gas extraction method, or a solution crystallization method, so as to more narrow the molecular weight distribution thereof, are also usable. Further, the above release agents from which impurities such as low-molecular-weight solid fatty acids, low-molecular-weight solid alcohols, and low-molecular-weight solid compounds are removed are also usable.

In some embodiments, the release agent has a melting point of 70 to 140° C. or 70 to 120° C. in view of improvement of blocking resistance and offset resistance of the toner. When the melting point is less than 70° C., blocking resistance of the toner may be poor. When the melting point is greater than 140° C., hot offset resistance of the toner may be poor.

When two or more waxes are used in combination, plasticizing and releasing functions may be simultaneously expressed. Specific examples of waxes having high plasticizing function include, but are not limited to, those having a low melting point, a branched molecular structure, or a polar group. Specific examples of waxes having high releasing function include, but are not limited to, those having a high melting point, a straight-chain molecular structure, or no functional group (i.e., being non-polar). For example, a combination of two waxes each having a melting point different from each other by 10 to 100° C. and another combination of a polyolefin with a graft-modified polyolefin are usable.

When two or more waxes are used in combination, one having a relatively low melting point expresses plasticizing function and one having a relatively high melting point expresses releasing function. When the difference in melting point is 10 to 100° C., the two functions are effectively separately expressed. When the difference in melting point is less than 10° C., it may be difficult to separate the two functions effectively. When the difference in melting point is greater than 100° C., the two functions may not generate a synergistic effect. In some embodiments, at least one wax has a melting point of 70 to 120° C. or 70 to 100° C. so that the two functions are effectively separated.

It is likely that waxes having a branched structure or a polar group (e.g., functional group) or those modified with a component different from its main component express plasticizing function. By contrast, it is likely that waxes having a straight-chain structure or no functional group (i.e., being non-polar) or those unmodified express releasing function. Specific combinations which express both plasticizing and releasing functions include, but are not limited to, a combination of a polyethylene homopolymer or copolymer consisting primarily of ethylene with a polyolefin homopolymer or copolymer consisting primarily of an olefin other than ethylene; a combination of a polyolefin with a graft-modified polyolefin; a combination of an alcohol wax, a fatty acid wax, or an ester wax with a hydrocarbon wax; a combination of a Fischer-Tropsch wax or a polyolefin wax with a paraffin wax or a microcrystalline wax; a combination of a Fischer-Tropsch wax with a polyolefin wax; a combination of a paraffin wax with a microcrystalline wax; and a combination of a carnauba wax, a candelilla wax, a rice wax, or a MONTANE wax with a hydrocarbon wax.

When the toner includes one of the above combinations, in an endothermic curve of the toner measured by DSC, a maximum peak may be observed within a temperature range of 70 to 110° C.

In some embodiments, the content of the wax is 0.2 to 20 parts by weight or 0.5 to 10 parts by weight based on 100 parts of the binder resin.

The melting point of release agent is defined as a temperature at which the maximum endothermic peak is observed in an endothermic curve of the release agent measured by differential scanning calorimetry (DSC).

An endothermic curve can be obtained by a high-precision inner-heat power-compensation differential scanning calorimeter based on a method according to ASTM D3418-82. In some embodiments, an endothermic curve is obtained by heating a sample at a heating rate of 10° C./min after preliminarily heating and cooling the sample.

In some embodiments, the toner includes a fluidity improving agent. The fluidity improving agent is generally externally added to the surface of the toner to improve fluidity of the toner.

Specific materials usable as the fluidity improving agent include, but are not limited to, carbon black; fine powders of fluorocarbon resins such as vinylidene fluoride and polytetrafluoroethylene; fine powders of silica prepared by a wet process or a dry process; fine powders of titanium oxide; fine powders of alumina; and fine powders of silica, titanium oxide, and alumina which are surface-treated with a silane-coupling agent, a titanium-coupling agent, or a silicone oil. In some embodiments, fine powders of silica, titanium oxide, or alumina are used. In some embodiments, fine powders of silica which are surface-treated with a silane-coupling agent or a silicone oil are used. Fine powders of silica may be obtained by gas phase oxidation of silicon halide, and they are generally called as fumed silica.

Specific examples of commercially available fine powders of such silica obtained by gas phase oxidation of silicon halides include, but are not limited to, AEROSIL-130, -300, -380, -TT600, -MOX170, -MOX80, and -COK84 (from Nippon Aerosil Co., Ltd.); CAB-O-SIL-M-5, -MS-7, -MS-75, -HS-5, and -EH-5 (from Cabot Corporation); WACKER HDK-N20V15, -N20E, -T30, and -T40 (from Wacker Chemie AG); D-C Fine Silica (from Dow Corning Corporation); and Fransol (from Fransil).

In some embodiments, fine powders of hydrophobized silica obtained by gas phase oxidation of silicon halides having a hydrophobicity degree of 30 to 80% measured by a methanol titration test are used. Hydrophobicity is given by chemically or physically treating silica with an organic silicon compound which is reactive with or adsorptive to the silica. In some embodiments, fine powders of silica obtained by gas phase oxidation of silicon halides treated with an organic silicon compound are used.

Specific examples of the organic silicon compound for treating silica include, but are not limited to, hydroxypropyltrimethoxysilane, phenyltrimethoxysilane, n-hexadecyltrimethoxysilane, n-octadecyltrimethoxysilane, vinyltrimethoxysilane, vinyltriethoxysilane, vinyltriacetoxysilane, dimethylvinylchlorosilane, divinylchlorosilane, γ-methacryloxypropyltrimethoxysilane, hexamethyldisilazane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethylethoxysilane, trimethylethoxysilane, trimethylmethoxysilane, methyltriethoxysilane, isobutyltrimethoxysilane, dimethyldimethoxysilane, diphenyldiethoxysilane, hexamethyldisiloxane, 1,3-divinyltetramethyldisiloxane, 1,3-diphenyltetramethyldisiloxane, and dimethylpolysiloxane having 2 to 12 siloxane units and 0 to 1 terminal silanol group. Other than the above compounds, silicone oils such as dimethyl silicone oil are also usable. Two or more of these materials can be used in combination.

In some embodiments, the fluidity improving agent has an average primary particle diameter of 0.001 to 2 μm or 0.002 to 0.2 μm. In some embodiments, the fluidity improving agent has a number average particle diameter of 5 to 100 nm or 5 to 50 nm.

In some embodiments, the fluidity improving agent has a specific surface area of 30 $m^2/g$ or more or 60 to 400 $m^2/g$ measured by the BET method employing nitrogen adsorption. In some embodiments, the surface-treated fluidity improving agent has a specific surface area of 20 $m^2/g$ or more or 40 to 300 $m^2/g$ measured by the BET method employing nitrogen adsorption.

In some embodiments, the content of the fluidity improving agent in the toner is 0.03 to 8 parts by weight based on 100 parts by weight of the toner.

The toner may further include other additives, such as metal soaps, fluorine-based surfactants, dioctyl phthalate, conductivity imparting agents (e.g., tin oxide, zinc oxide, carbon black, antimony oxide), and fine powders of inorganic materials (e.g., titanium oxide, aluminum oxide, alumina), for the purpose of protecting electrostatic latent image bearing members and carriers, improving cleanability and fixability, controlling thermal, electric, and physical properties, and controlling electric resistance and melting point.

The fine powders of inorganic materials may be optionally hydrophobized. The toner may further include other additives, such as lubricants (e.g., polytetrafluoroethylene, zinc stearate, polyvinylidene fluoride), abrasives (e.g., cesium oxide, silicon carbide, strontium titanate), anti-caking agents, and developability improving agents such as white or black particles having the opposite polarity to the toner particles.

For the purpose of controlling charge amount, the above-described additives may be treated with a silicone varnish, a modified silicone varnish, a silicone oil, a modified silicone oil, a silane-coupling agent, a silane-coupling agent having a functional group, or an organic silicon compound.

When preparing a developer, fine particles of inorganic materials (hereinafter "external additives") such as hydrophobized silica may be mixed with the toner to improve fluidity, storage stability, developability, and transferability of the developer. The toner may be mixed with such external additives by a mixer equipped with a jacket so that the inner temperature is variable. Load history given to the external additive may be varied when the external additive is gradually added or added from the middle of the mixing. Alternatively, it can be varied by varying the revolution, rotating speed, time, and temperature in the mixing. The load may be initially strong and may gradually weaken, or vice versa. Specific examples of usable mixers include, but are not limited to, a V-type mixer, a Rocking mixer, a Loedige mixer, a Nauta mixer, and a Henschel mixer.

Specific examples of usable inorganic materials include, but are not limited to, silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, and silicon nitride. In some embodiments, fine particles of the inorganic material have a primary particle diameter of 5 nm to 2,000 μm or 5 to 500 nm.

In some embodiments, fine particles of the inorganic material have a BET specific surface area of 20 to 500 $m^2/g$. In some embodiments, the content of the fine particles of the inorganic material in the toner is 0.01 to 5% by weight or 0.01 to 2% by weight.

Additionally, fine particles of polymers prepared by soap-free emulsion polymerization, suspension polymerization, or dispersion polymerization (e.g., polystyrene, copolymers of methacrylates or acrylates), polycondensation polymers (e.g., silicone, benzoguanamine, nylon), and thermosetting resins are also usable as the external additive.

The surface of the external additive may be hydrophobized so as to prevent deterioration even under high-humidity conditions. Specific examples of usable surface treatment agents include, but are not limited to, silane coupling agents, silylation agents, silane coupling agents having a fluorinated alkyl group, organic titanate coupling agents, aluminum coupling agents, silicone oils, and modified silicone oils.

The toner may further include a cleanability improving agent so as to be easily removable from an electrostatic latent image bearing member or a primary transfer medium when remaining thereon after image transfer. Specific materials usable as the cleanability improving agent include, but are not limited to, metal salts of fatty acids (e.g., zinc stearate, calcium stearate) and fine particles of polymers prepared by soap-free emulsion polymerization (e.g., polymethyl methacrylate, polystyrene). In some embodiments, fine particles of polymers having a relatively narrow size distribution and a volume average particle diameter of 0.01 to 1 μm are used.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Preparation of Colorant Dispersion

A carbon black (REGAL 400 from Cabot Corporation) in an amount of 17 parts and a colorant dispersant (AJISPER PB821 from Ajinomoto Fine-Techno Co., Inc.) in an amount of 3 parts are primarily dispersed in 80 parts of ethyl acetate with a mixer equipped with agitation blades.

The resulting primary dispersion is further subjected to a dispersion treatment with a bead mill filled with zirconia beads having a diameter of 0.3 mm (LMZ from Ashizawa Finetech Ltd.) so that the colorant particles are further pulverized and aggregates having a size of 5 μm or more are completely removed.

Preparation of Wax Dispersion

A carnauba wax in an amount of 18 parts and a wax dispersant in an amount of 2 parts are primarily dispersed in 80 parts of ethyl acetate with a mixer equipped with agitation blades.

The resulting primary dispersion is heated to 80° C. while being agitated so that the carnauba wax is dissolved therein. Subsequently, the primary dispersion is cooled to room temperature so that particles of the carnauba wax settle out with a maximum particle diameter of 3 μm or less.

As the wax dispersant, a polyethylene wax to which a styrene-butyl acrylate copolymer is grafted is used. The resulting dispersion is further subjected to a dispersion treatment using a bead mill (LMZ60 from Ashizawa Finetech Ltd.) so that the wax particles are further pulverized into particles with a maximum particle diameter of 1 μm or less.

Preparation of Toner Constituents Liquid

A toner constituents liquid 1 is prepared by uniformly mixing 100 parts of a polyester resin, 30 parts of the colorant dispersion, 30 parts of the wax dispersion, and 840 parts of ethyl acetate for 10 minutes with a mixer equipped with agitation blades. Either colorant or wax particles does not aggregate even when the dispersions are diluted with a solvent.

Example 1

The toner constituents liquid 1 is subjected to a decompression degassing treatment with a suction pump. The toner constituents liquid 1 is exposed to a reduced pressure of −60 kPa for 20 minutes while being agitated.

After the treatment, the amount of dissolved oxygen in the toner constituents liquid 1 is measured by an organic-solvent-responsive dissolved oxygen analyzer DO METER B-506 (from Iijima Electronics Corporation). The amount of dissolved oxygen in the toner constituents liquid 1 is 2.8 mg/L.

Thereafter, the toner constituents liquid 1 is set in the apparatus 1 illustrated in FIG. 9 including the liquid droplet forming unit illustrated in FIGS. 1 and 2. The liquid droplet forming unit 2 has 400 liquid column resonance liquid chambers 18, each of which having four nozzles. Namely, the liquid droplet forming unit 2 has 1,600 nozzles in total.

Referring to FIG. 1, the length L between both longitudinal ends of the liquid column resonance liquid chamber 18 is 1.85 mm and the resonant mode N is 2. The four nozzles are disposed within an area including an antinode of the pressure standing wave.

A drive signal generator (Function Generator WF 1973 from NF Corporation) is connected to the vibration generator 20 with a lead wire covered with polyethylene. The vibrating material is supplied with a sine-wave-shape voltage signal having a frequency of 330 kHz and a peak value of 9.0 V. The drive frequency is 340 kHz, which is equal to the liquid column resonant frequency.

All the nozzles are kept under observation so as to monitor the number of nozzles which are stably discharging the toner constituents liquid during 1-hour driving. As a result, 1,590 nozzles out of 1,600 nozzles are reliably discharging the toner constituents liquid during 1-hour driving.

Referring to FIG. 10, the cylindrical shroud 66 has a diameter of 50 mm and its opening diameter is 10 mm. Referring to FIG. 9, the cylindrical chamber 61 has an inner diameter of 400 mm and a height of 2,000 mm. The chamber 61 is fixed vertically. The upper and lower ends of the chamber 61 are tapered so that each of the conveyance air current inlet 64 and the conveyance air current outlet 65 has a diameter of 50 mm. The liquid droplet discharge unit 2 is disposed to the center of the chamber 61 at a height 300 mm higher than the upper end of the chamber 61. The conveyance air is nitrogen gas having a speed of 10.0 m/s and a temperature of 40° C.

Example 2

The toner constituents liquid 1 is subjected to a decompression degassing treatment with a suction pump. The toner constituents liquid 1 is exposed to a reduced pressure of −80 kPa for 5 minutes while being agitated.

After the treatment, the amount of dissolved oxygen in the toner constituents liquid 1 is measured by an organic-solvent-responsive dissolved oxygen analyzer DO METER B-506 (from Iijima Electronics Corporation). The amount of dissolved oxygen in the toner constituents liquid 1 is 2.0 mg/L.

The procedure for discharging the toner constituents liquid in Example 1 is repeated.

As a result, 1,596 nozzles out of 1,600 nozzles are reliably discharging the toner constituents liquid during 1-hour driving.

Example 3

The toner constituents liquid 1 is subjected to a degassing treatment by being exposed to a reduced pressure of −60 kPa for 2 minutes while being applied with an ultrasonic vibration of 28 kHz and 40 W. The amount of dissolved oxygen in the toner constituents liquid 1 is 1.8 mg/L.

The procedure for discharging the toner constituents liquid in Example 1 is repeated.

As a result, 1,595 nozzles out of 1,600 nozzles are reliably discharging the toner constituents liquid during 1-hour driving.

Example 4

The toner constituents liquid 1 is subjected to a degassing treatment with a degasifier (SEPAREL PF03DG from DIC Corporation) equipped with a hollow fiber membrane. The toner constituents liquid 1 is exposed to a reduced pressure of −90 kPa at a liquid feed speed of 20 mL/min. The amount of dissolved oxygen in the toner constituents liquid 1 is 2.9 mg/L.

The procedure for discharging the toner constituents liquid in Example 1 is repeated.

As a result, 1,522 nozzles out of 1,600 nozzles are reliably discharging the toner constituents liquid during 1-hour driving.

Comparative Example 1

The toner constituents liquid 1 is subjected to a degassing treatment with a degasifier (SEPAREL PF03DG from DIC Corporation) equipped with a hollow fiber membrane. The toner constituents liquid 1 is exposed to a reduced pressure of −90 kPa at a liquid feed speed of 200 mL/min. The amount of dissolved oxygen in the toner constituents liquid 1 is 3.1 mg/L.

The procedure for discharging the toner constituents liquid in Example 1 is repeated.

As a result, 613 nozzles out of 1,600 nozzles are reliably discharging the toner constituents liquid during 1-hour driving. During the 1-hour driving, the toner constituents liquid exudes from some nozzles and clogges the peripheral nozzles.

Comparative Example 2

The toner constituents liquid which is not subjected to any degassing treatment is discharged in the apparatus 1 in the same manner as Example 1. The amount of dissolved oxygen in the toner constituents liquid 1 is 6.8 mg/L.

As a result, 220 nozzles out of 1,600 nozzles are reliably discharging the toner constituents liquid during 1-hour driving.

Comparative Example 3

The toner constituents liquid which is subjected to a bubbling treatment with air without any degassing treatment is discharged in the apparatus 1 in the same manner as Example 1. The amount of dissolved oxygen in the toner constituents liquid 1 is 7.5 mg/L.

As a result, 135 nozzles out of 1,600 nozzles are reliably discharging the toner constituents liquid during 1-hour driving.

When the amount of dissolved oxygen in the toner constituents liquid is 3.0 mg/L or less, the number of nozzles which cannot keep discharging the toner constituents liquid is reduced, which is advantageous in continuously and reliably producing toner particles having a narrow particle size distribution.

Additional modifications and variations in accordance with further embodiments of the present invention are possible in light of the above teachings. It is therefore to be understood that within the scope of the appended claims the invention may be practiced other than as specifically described herein.

What is claimed is:

1. A method of manufacturing toner, comprising:
dissolving or dispersing toner constituents in an organic solvent to prepare a toner constituents liquid;
degassing the toner constituents liquid so that the toner constituents liquid includes dissolved oxygen in an amount of 3 mg/L or less, wherein the degassing is performed by any one of (a) containing the toner constituents liquid in a container and reducing a pressure in the container, (b) passing the toner constituents liquid inside a hollow fiber membrane tube and reducing a pressure outside the hollow fiber membrane tube, and (c) contacting the toner constituents liquid with a gas having a low solubility in the toner constituents liquid;
vibrating the toner constituents liquid in a chamber having at least one nozzle to form a liquid column resonance standing wave in the toner constituents liquid;
discharging the toner constituents liquid from the nozzle to form the toner constituents liquid into liquid droplets, the nozzle being disposed within an area including an antinode of the liquid column resonance standing wave; and
drying the liquid droplets to solidify the liquid droplets into solid particles.

2. The method according to claim 1, wherein the degassing includes:
containing the toner constituents liquid in a container; and reducing a pressure in the container.

3. The method according to claim 1, wherein the degassing includes:
passing the toner constituents liquid inside a hollow fiber membrane tube; and
reducing a pressure outside the follow fiber membrane tube.

4. An apparatus for manufacturing toner, comprising:
a degasifier adapted to degas a toner constituents liquid so that the toner constituents liquid includes dissolved oxygen in an amount of 3 mg/L or less, wherein the degasifier performs degassing by any one of (a) containing the toner constituents liquid in a container and reducing a pressure in the container, (b) passing the toner constituents liquid inside a hollow fiber membrane tube and reducing a pressure outside the hollow fiber membrane tube, and (c) contacting the toner constituents liquid with a gas having a low solubility in the toner constituents liquid, the toner constituents liquid including an organic solvent and toner constituents dissolved or dispersed therein;
a liquid droplet forming device adapted to form the toner constituents liquid into liquid droplets, the liquid droplet forming device including:
a chamber having at least one nozzle; and a vibrator adapted to vibrate the toner constituents liquid in the chamber to form a liquid column resonance standing wave in the toner constituents liquid so that the toner constituents liquid is discharged from the nozzle being disposed within an area including an antinode of the liquid column resonance standing wave; and a solidifying device adapted to solidify the liquid droplets into solid particles.

5. The apparatus according to claim 4, further comprising a measuring device adapted to measure an amount of dissolved oxygen in the toner constituent liquid.

6. The apparatus according to claim 4, wherein the degasifier includes:

a container adapted to contain the toner constituents liquid; and a decompressor adapted to reduce a pressure in the container.

7. The apparatus according to claim 4, wherein the degasifier includes:

a hollow fiber membrane tube adapted to pass the toner constituents liquid therein; and a decompressor adapted to reduce a pressure outside the follow fiber membrane tube.

8. A method of manufacturing resin particles, comprising:

dissolving or dispersing a resin in an organic solvent or melting a resin to prepare a resin liquid;

degassing the resin liquid so that the resin liquid includes dissolved oxygen in an amount of 3 mg/L or less, wherein the degassing is performed by any one of (a) containing the toner constituents liquid in a container and reducing a pressure in the container, (b) passing the toner constituents liquid inside a hollow fiber membrane tube and reducing a pressure outside the hollow fiber membrane tube, and (c) contacting the toner constituents liquid with a gas having a low solubility in the toner constituents liquid;

vibrating the resin liquid in a chamber having at least one nozzle to form a liquid column resonance standing wave in the resin liquid;

discharging the resin liquid from the nozzle to form the resin liquid into liquid droplets, the nozzle being disposed within an area including an antinode of the liquid column resonance standing wave; and drying the liquid droplets to solidify the liquid droplets into solid particles.

* * * * *